United States Patent
Maekawa

(10) Patent No.: US 11,507,044 B2
(45) Date of Patent: Nov. 22, 2022

(54) ABNORMALITY DIAGNOSIS APPARATUS AND ABNORMALITY DIAGNOSIS METHOD

(71) Applicant: Mitsubishi Electric Corporation, Chiyoda-ku (JP)

(72) Inventor: Kiyoshi Maekawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1020 days.

(21) Appl. No.: 16/099,333

(22) PCT Filed: Jun. 7, 2017

(86) PCT No.: PCT/JP2017/021169
§ 371 (c)(1),
(2) Date: Nov. 6, 2018

(87) PCT Pub. No.: WO2017/213182
PCT Pub. Date: Dec. 14, 2017

(65) Prior Publication Data
US 2019/0137966 A1     May 9, 2019

(30) Foreign Application Priority Data

Jun. 7, 2016    (JP) .............................. JP2016-113859

(51) Int. Cl.
*G05B 19/402*     (2006.01)
*H02P 29/032*     (2016.01)
(Continued)

(52) U.S. Cl.
CPC ......... *G05B 19/402* (2013.01); *G05B 19/404* (2013.01); *G05B 23/0275* (2013.01);
(Continued)

(58) Field of Classification Search
CPC ........ G05B 19/404; G05B 2219/41154; G05B 2219/41448; G05B 2219/43022;
(Continued)

(56) References Cited

U.S. PATENT DOCUMENTS 5,819,202 A  * 10/1998  Sato .................. G05B 19/4061
                                                           700/184
9,122,258 B2    9/2015  Sekiguchi et al.
(Continued)

FOREIGN PATENT DOCUMENTS

CN          104283484 A       1/2015
DE    10 2014 009 598 A1      1/2015
(Continued)

OTHER PUBLICATIONS

German Office Action dated Oct. 21, 2021, in German Application No. 112017002846.9.
(Continued)

*Primary Examiner* — Bickey Dhakal
(74) *Attorney, Agent, or Firm* — Xsensus LLP

(57) ABSTRACT

An abnormality diagnosis apparatus includes: a friction identification unit that calculates a friction parameter that is a parameter used for calculation of frictional force of a power transmission mechanism connected to a motor; a model torque calculation unit that calculates model torque by performing a process of calculating an estimated value of torque of the motor by using a set value calculated in advance and the friction parameter; and an abnormality determination unit that diagnoses whether the power transmission mechanism is abnormal, on the basis of a result of comparison between the model torque and a motor torque detected by a motor torque detection unit.

20 Claims, 18 Drawing Sheets

(51) Int. Cl.
*H02P 29/024* (2016.01)
*G05B 19/404* (2006.01)
*G05B 23/02* (2006.01)
*H02P 29/028* (2016.01)

(52) U.S. Cl.
CPC ........ *H02P 29/028* (2013.01); *H02P 29/0241* (2016.02); *H02P 29/032* (2016.02); *G05B 2219/41154* (2013.01)

(58) Field of Classification Search
CPC ..... H02P 29/028; B25J 9/1633; B25J 9/1674; B25J 9/1641
See application file for complete search history.

(56) References Cited

U.S. PATENT DOCUMENTS

| | | | |
|---|---|---|---|
| 2007/0244609 A1 | 10/2007 | Kinoshita et al. | |
| 2008/0033695 A1* | 2/2008 | Sahara .................... | G01H 1/003 |
| | | | 702/185 |
| 2008/0215292 A1 | 9/2008 | Kato et al. | |
| 2011/0229164 A1 | 9/2011 | Watahiki | |
| 2012/0022690 A1* | 1/2012 | Ooga .................... | B25J 9/1633 |
| | | | 700/258 |
| 2012/0065781 A1 | 3/2012 | Ikeda et al. | |
| 2013/0006551 A1 | 1/2013 | Sako et al. | |
| 2015/0008861 A1 | 1/2015 | Sonoda | |
| 2016/0121484 A1 | 5/2016 | Ikeda et al. | |
| 2016/0346885 A1* | 12/2016 | Ikai ........................ | G05B 19/19 |
| 2018/0181083 A1* | 6/2018 | Kosaka ................... | G05B 5/01 |

FOREIGN PATENT DOCUMENTS

| | | |
|---|---|---|
| JP | 2005-245113 A | 9/2005 |
| JP | 2007-286904 A | 11/2007 |
| JP | 2008-32477 A | 2/2008 |
| JP | 2009-202335 A | 9/2010 |
| JP | 2011-215605 A | 10/2011 |
| JP | 2012-61535 A | 3/2012 |
| JP | 2012-194035 A | 10/2012 |
| JP | 2015-15844 A | 1/2015 |
| WO | WO 2011/108391 A1 | 9/2011 |
| WO | WO 2012/160874 A1 | 11/2012 |

OTHER PUBLICATIONS

International Search Report dated Sep. 12, 2017 in PCT/JP2017/021169 filed on Jun. 7, 2017.
Office Action dated Jul. 5, 2021, in corresponding Chinese patent Application No. 201780033992.X, 26 pages.

* cited by examiner

ABNORMALITY DIAGNOSIS APPARATUS AND ABNORMALITY DIAGNOSIS METHOD

FIELD

The present invention relates to an abnormality diagnosis apparatus and an abnormality diagnosis method for a power transmission mechanism such as a reducer, a speed-up gear, and a ball screw used in a drive unit of a mechanical system such as a robot.

BACKGROUND

Articulated industrial robots well-known in the art uses power transmission mechanisms for transmitting driving force of motors at the respective joints. Use of the industrial robot for a long period of time may deteriorate a power transmission mechanism due to accumulation of load acting during the operation, and thus lead to the failure of the power transmission mechanism. When the industrial robot cannot keep doing work because the robot fails to provide its original performance or suddenly stops due to the advancement of the failure, a production line needs to be stopped for repair. For this reason, there has been a demand for a technology for diagnosing whether the power transmission mechanisms are abnormal.

A method described in Patent Literature 1 discloses a technology for comparing a vibration pattern caused by deterioration of the power transmission mechanism and a vibration pattern during the normal driving, thereby diagnosing whether the power transmission deteriorates. In addition, the method described in Patent Literature 1 discloses a technology for using a spectrum extracted from disturbance torque acting on a power transmission mechanism, thereby diagnosing whether the power transmission deteriorates.

CITATION LIST

Patent Literature

Patent Literature 1: Japanese Patent Application Laid-open No. 2008-32477

SUMMARY

Technical Problem

According to the technologies of the related art mentioned above, whether the power transmission mechanism deteriorates can be diagnosed on the basis of the vibration patterns or the extracted spectrum. The technologies of the related art, however, are disadvantageous in that the influence of friction torque that changes depending on the temperature of the power transmission mechanism cannot be removed.

The present invention has been made in view of the above, and an object thereof is to provide an abnormality diagnosis apparatus that reduces the influence of a change in friction, which is a change in characteristic, to thereby diagnoses with high accuracy whether the power transmission mechanism is abnormal.

Solution to Problem

To solve the aforementioned problems and achieve the object, an abnormality diagnosis apparatus according to the present invention includes: a friction identification unit to calculate a friction parameter; a model torque calculation unit to calculate model torque by using a set value calculated in advance and the friction parameter; and an abnormality determination unit to diagnose whether the power transmission mechanism is abnormal, on the basis of a result of comparison between the model torque and motor torque of a motor detected by a motor torque detection unit.

Advantageous Effects of Invention

The present invention produces an advantageous effect of reducing the influence of the change in friction, which is the change in characteristic, to thereby diagnose with high accuracy whether the power transmission mechanism is abnormal.

DESCRIPTION OF EMBODIMENTS

Abnormality diagnosis apparatuses and abnormality diagnosis methods according to certain embodiments of the present invention will be described in detail below with reference to the drawings. Note that the present invention is not limited to the embodiments.

First Embodiment

Figure 1:
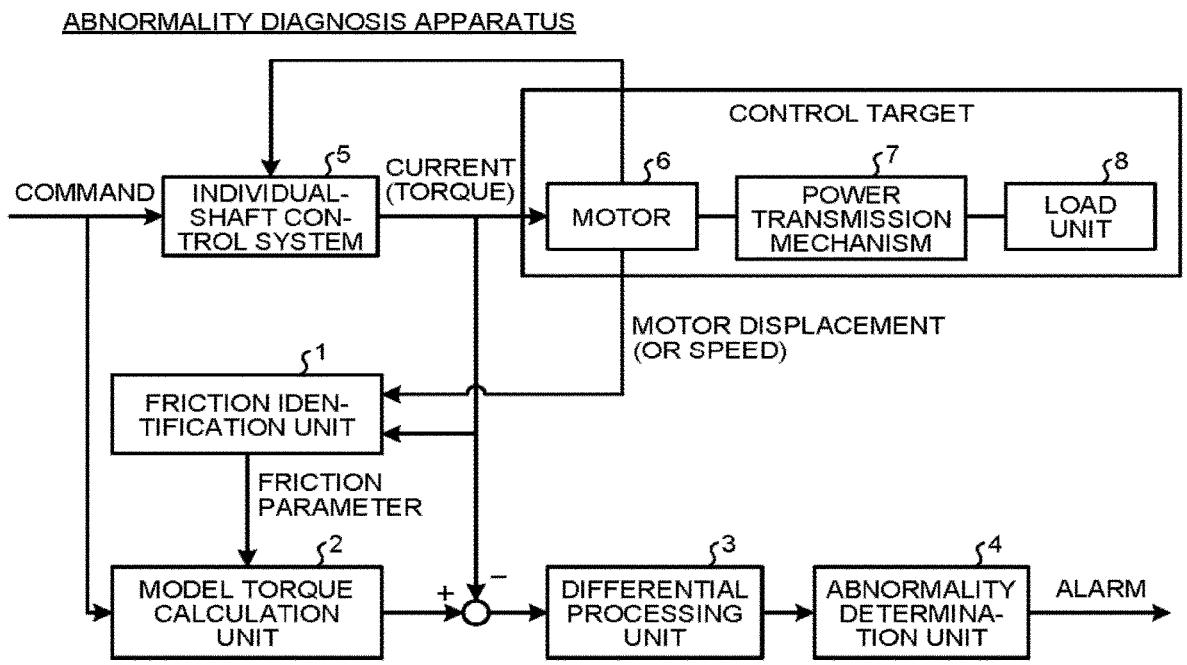
FIG. 1 is a block diagram of an abnormality diagnosis apparatus according to a first embodiment.

FIG. 1 is a block diagram illustrating an abnormality diagnosis apparatus according to a first embodiment of the present invention. The abnormality diagnosis apparatus according to the present embodiment includes a friction identification unit 1, a model torque calculation unit 2, a motor torque detection unit, and an abnormality determination unit 4. The friction identification unit 1 performs an identification process to thereby calculate a friction parameter detected value of a motor 6 as a friction parameter, the motor 6 being connected to a power transmission mechanism 7 of machinery. The model torque calculation unit 2 uses the friction parameter and set values to perform a process of calculating model torque, that is, an estimated value of the torque of the motor 6 driven in accordance with a friction characteristic. Note that the set values refer to an inertia matrix M(p), centrifugal force h(p,v) and Coriolis force, and gravity g(p) calculated from known parameters such as the mass and the center of gravity of the machinery. The motor torque detection unit detects the motor torque of the motor 6. On the basis of a result of comparison between the model torque and the motor torque, the abnormality determination unit 4 diagnoses whether the power transmission mechanism 7 is abnormal. Note that the power transmission mechanism 7 according to the present embodiment functions as a reducer, an accelerator, or a gear motor.

The machinery is an industrial machine such as an industrial robot (not illustrated), a machine tool, a molding machine, or a conveyor, and has a drive mechanism having one or more drive shafts. The present embodiment is an embodiment applicable to any machinery; however, the embodiment is described as being applied to, by way of example, a control target that is an industrial robot having six drive shafts. The industrial robot, which has the six drive shafts, have six driving motors 6 and six power transmission mechanisms 7.

For the abnormality diagnosis apparatus having the example configuration illustrated in FIG. 1, a position command for the motor 6 for driving each axis of a robot is generated in a control device of the machinery. An individual-shaft control system 5 controls the motor 6 built in the robot such that the motor 6 follows the given position command. In addition, the individual-shaft control system 5 includes a motor current measurement unit that functions as the motor torque detection unit. The individual-shaft control system 5 multiples motor current, measured by the motor current measurement unit, by a torque constant to thereby calculate the motor torque τm. The friction identification unit 1 identifies a parameter relating to friction of each shaft of the robot. Details of the inside of the friction identification unit 1 will be described later.

Figure 2:
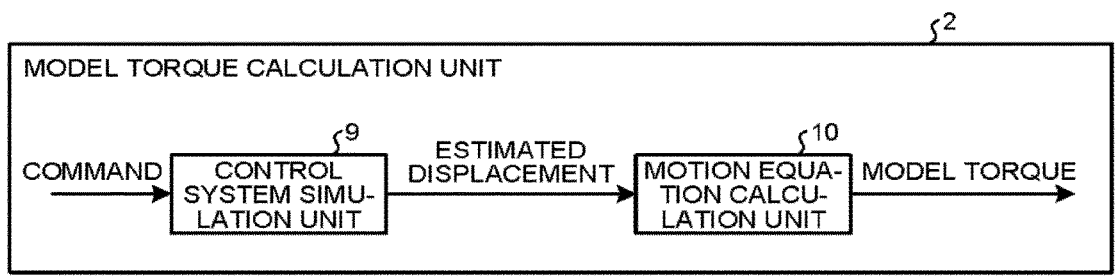
FIG. 2 is a diagram illustrating an example of a model torque calculation unit in the first embodiment.

The model torque calculation unit 2 receives an input of a position command, and calculates model torque that is a predicted value of motor torque generated by the motor 6 that drives each shaft of the robot. An internal block diagram of the model torque calculation unit 2 is illustrated in FIG. 2. In the model torque calculation unit 2, the position command is input to a control system simulation unit 9, and an estimated displacement, which is an output of the control system simulation unit 9 is input to a motion equation calculation unit 10.

Figure 3:
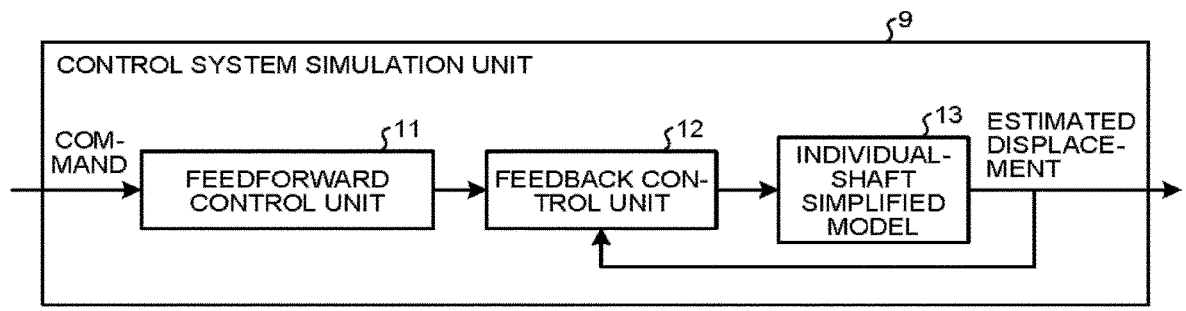
FIG. 3 is a diagram illustrating an example of a control system simulation unit in the first embodiment.
Figure 4:
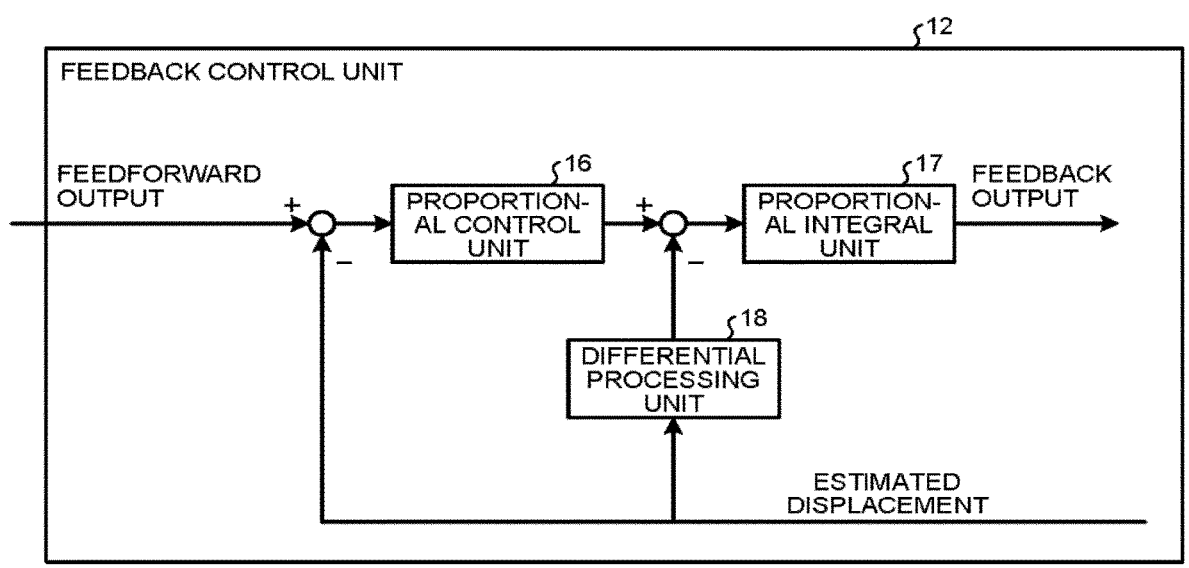
FIG. 4 is a diagram illustrating an example of the inside of a feedback control unit in the first embodiment.

A block diagram of the control system simulation unit 9 is illustrated in FIG. 3. The control system simulation unit 9 includes a feedforward control unit 11, a feedback control unit 12, and an individual-shaft simplified model 13. The feedforward control unit 11, which is constituted by one or more filtering units, performs feedforward control on the position command input from the outside, and performs feedforward output. The feedback control unit 12 illustrated in FIG. 4 includes a proportional control unit 16, a proportional integral unit 17, and a differential processing unit 18 of a control system used for feedback control of the machinery. The proportional control unit 16 performs proportional position control and proportional integral speed control on the input feedforward output.

The individual-shaft simplified model 13 is an approximate model of a control target as viewed from one corresponding shaft in one-inertial system. The estimated displacement output from the individual-shaft simplified model 13 in the control system simulation unit 9 is an estimated value of motor displacement reflecting the dynamic characteristics of the feedforward control and feedback control. Note that the control system simulation unit 9 performs control on each of the six shafts of the six-shaft industrial robot. While the control system simulation unit 9 in the present embodiment is a dynamic-characteristic model including the dynamic characteristic of the control target, the control system simulation unit 9 may be a simpler one that is the feedforward control unit 11.

Alternatively, the model torque calculation unit 2 may calculate the model torque, which is an estimated value of the torque of the motor 6, by using a position command given to the motor 6 and the dynamic-characteristic model indicating the dynamic characteristic of the machinery. Note that the dynamic-characteristic model includes an estimated friction with a friction parameter updated in accordance with update instruction information output by the friction identification unit 1. Note that the estimated friction is a sum of Coulomb friction and viscous friction proportional to the speed.

The motion equation calculation unit 10 of the model torque calculation unit 2 receives estimated displacements of six shafts input from the control system simulation unit 9 and differentiates the input estimated displacements of the six shafts with respect to time, thereby calculating estimated speeds of the six shafts. The motion equation calculation unit 10 also differentiates the calculated estimated speeds with respect to time to thereby calculate estimated accelerations of the six shafts. In a certain calculation period, a vector τe constituted by model torque is obtained by equation (1) below:

$$\tau e = M(p)a + h(p,v) + g(p) + f(v) \qquad (1)$$

where "p" represents a vector constituted by an estimated displacement, "v" represents a vector constituted by an estimated speed, and "a" represents a vector constituted by an estimated acceleration.

The motion equation calculation unit 10 of the model torque calculation unit 2 calculates τe by equation (1). In the equation, "M(p)" represents an inertia matrix, "h(p,v)" represents centrifugal force and Coriolis force, "g(p)" represents gravity, and "f(v)" represents frictional force. When parameters such as the mass and the center of gravity of an industrial robot that is the control target are known, M(p), h(p,v), and g(p) can be determined by calculation. In contrast, the frictional force f(v), which has parameters such as a friction coefficient varying depending on temperature, cannot be correctly calculated unless the friction coefficient of the current drive shaft is unknown. To address this issue the first embodiment defines in advance a formula for calculating the frictional force, and the friction identification unit 1 calculates a current value of the parameter to be used in the formula for calculating the frictional force. In the friction identification unit 1, the frictional force fi of the i-th shaft can be modeled by a formula expressed by equation (2) below.

$$fi = k1i * \mathrm{sgn}(vi) + k2i * vi \tag{2}$$

In the equation, "vi" represents the speed of the i-th shaft, "sgn( )" is a function that outputs "1" when the value in the parentheses "( )" is positive, outputs "−1" when the value is negative, or outputs "0" when the value is 0, and k1i and k2i are parameters. k1i represents the Coulomb friction coefficient of the i-th shaft. k2i represents viscous friction coefficient of the i-th shaft. The first term of the right side of equation (2) represents moving direction friction torque, and the second term of the right side of equation (2) represents speed friction torque. In the present embodiment, the frictional force of each shaft is expressed by a sum of the moving direction friction torque and the speed friction torque, the direction friction torque being the Coulomb friction, and the speed friction torque being the viscous friction proportional to the speed. Note that the viscous friction is not necessarily proportional to the speed to the power of 1, but may be assumed to be proportional to the speed to the power of a value other than 1 such as being proportional to the speed to the one half power. The viscous friction as discussed herein is assumed to be proportional to the speed to the power of 1. The friction identification unit 1 performs a process of sequentially identifying k1i and k2i, which are parameters of equation (2).

The friction identification unit 1 calculates parameters in the manner as discussed below. In the present embodiment, the friction identification unit 1 uses either a motor torque τm calculated by multiplying a measured motor current value by a torque constant or a motor torque τm detected by a torque sensor. Note that a motor displacement measurement unit such as an encoder measures a motor displacement represented by "pm". The friction identification unit 1 calculates "vm" that is the time-differential of "pm", and "am" that is the time-differential of "vm" inside the friction identification unit 1. Subsequently, the friction identification unit 1 calculates driving torque τl other than the frictional force, from the motor displacement pm, the time-differential vm, and the time-differential am by equation (3) below.

$$\tau l = M(pm)am + h(pm,vm) + g(pm) \tag{3}$$

i-th shaft components of τl, τm, and vm are represented by "τli", "τmi", and "vmi", respectively, and the value of a k-th identification period is expressed by "[k]". The friction identification unit 1 calculates "yi", "Ri", and "ri" by below equations (4) to (6), respectively, and calculates kpi [k] by below equation (7).

$$yi[k] = [\mathrm{sgn}(vmi[k]), vmi[k]] \tag{4}$$

$$Ri[k] = Ri[k-1] + st*(-si*Ri[k-1] + yi[k]^T yi[k]) \tag{5}$$

$$ri[k] = ri[k-1] + st*(-si*ri[k-1] + (\tau mi[k] - \tau li[k])*yi[k]^T) \tag{6}$$

$$kpi[k] = kpi[k-1] - st*Gi(Ri[k]kpi[k-1] - ri[k]) \tag{7}$$

In this process, a first element of kpi[k] is an identified value k1i[k] of k1i in the k-th identification period, and a second element of kpi[k] is k2i[k] that is an identified value of k2i in the k-th identification period. Specifically, kpi calculated by equation (7) is a vector with two rows and one column. An element in the first row and the first column of kpi is the first element. An element in the second row and the first column of kpi is the second element. Note that "st" represents a period of sequential identification, and "si" and "Gi" represent preset gains. The friction identification unit 1 provides identification results for each shaft, that are friction parameters k1i[k] and k2i[k]. These parameters k1i[k] and k2i[k] are output as friction parameter identification results to the model torque calculation unit 2. Note that an identified gain is a constant and a matrix constituted by constants. The friction identification unit 1 outputs kpi, which is an identification result calculated by equation (7). Note that kpi output by the friction identification unit 1 represents an identification result for k1i and k2i of equation (2) and is used as the update instruction information for updating the parameters.

The motion equation calculation unit 10 of the model torque calculation unit 2 calculates the frictional force by using a result of sequential identification output from the friction identification unit 1. The motion equation calculation unit 10 adds the calculated frictional force f(v) to (M(p)a+h(p,v)+g(p)) that is a sum of inertial force M(p)a, the centrifugal force and the Coriolis force h(p,v), and the gravity g(p), to thereby obtain the model torque, which is an estimated value of the torque of the motor 6. The motor torque τm detected by the motor torque detection unit is subtracted from a vector τe constituted by the calculated model torque. The differential processing unit 3 differentiates the result of this subtraction with respect to time. While the present embodiment subtracts the motor torque from the model torque before the differentiation of the result of the subtraction with respect to time, each of time-differential of the model torque and time-differential of the motor torque may be calculated, and then the calculated time-differential of the motor torque is subtracted from the time-differential of the model torque. In addition, while the time-differential is used as a high-pass filter in the present embodiment, a high-pass filter other than the time subtraction may be used. Specifically, a high-pass filter has a characteristic of allowing passage of only signal components of frequencies higher than a preset frequency. Note that on the basis of the signal components having passed through the high-pass filter, the abnormality determination unit 4 is capable of diagnosing whether the power transmission mechanism 7 is abnormal.

Figure 5:
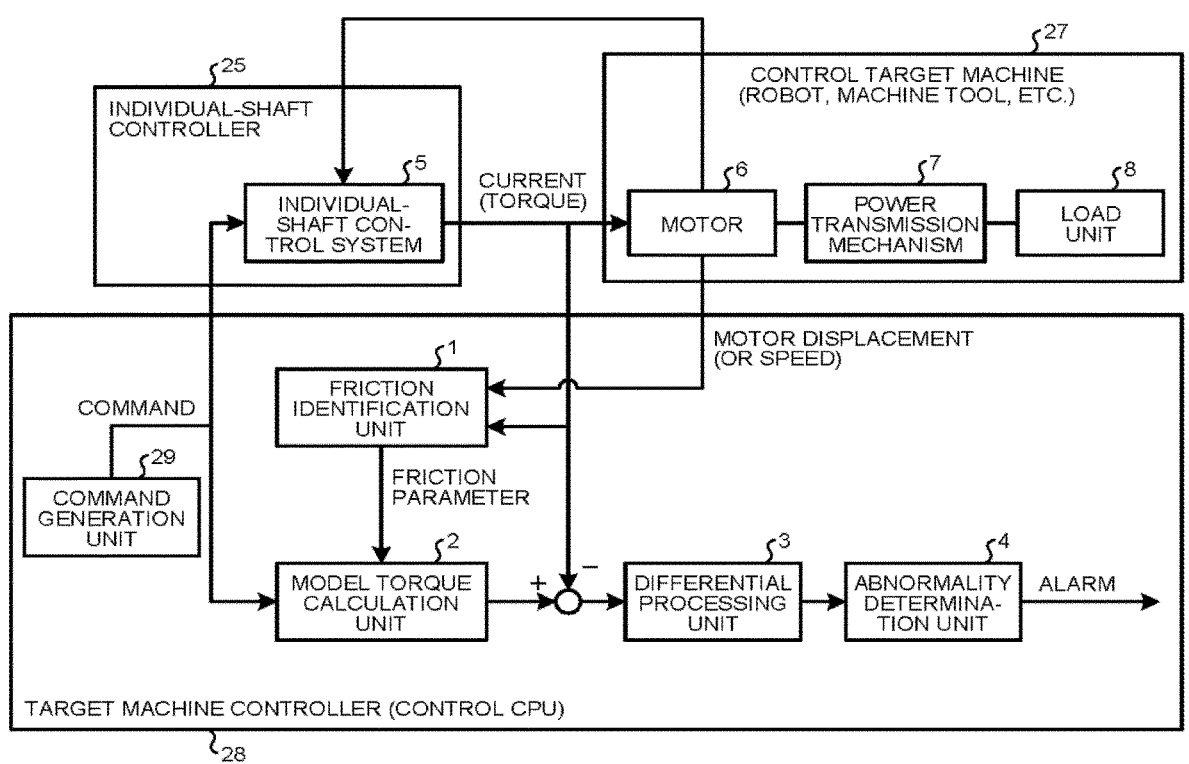
FIG. 5 is a diagram illustrating first example implementation of the abnormality diagnosis apparatus in the first embodiment.
Figure 6:
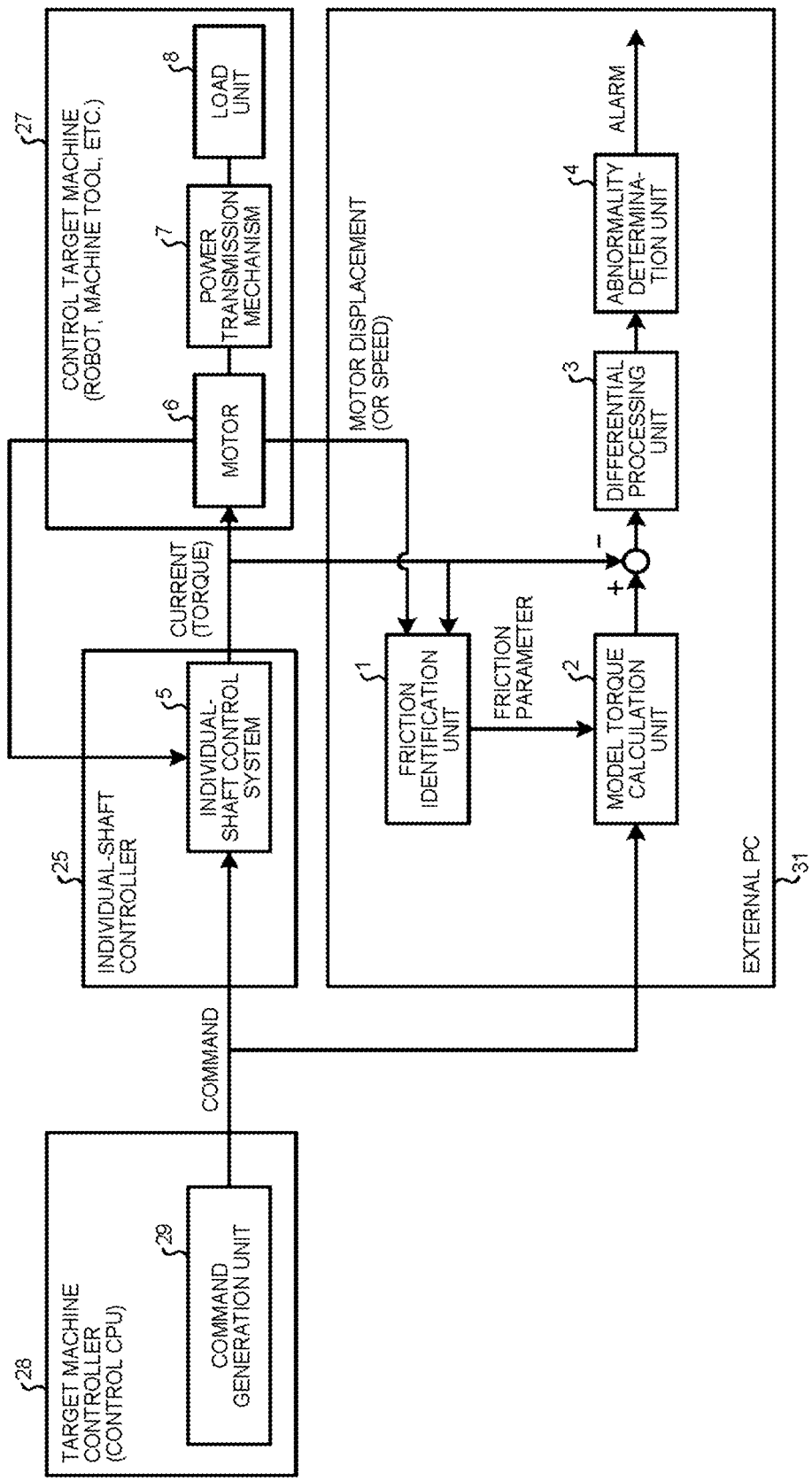
FIG. 6 is a diagram illustrating second example implementation of the abnormality diagnosis apparatus in the first embodiment.

The abnormality determination unit 4 calculates the maximum value of the absolute value of time-differential of a result of subtracting the motor torque τm detected by the motor torque detection unit from the model torque τe. When the calculated maximum value of the absolute value is equal to or larger than a reference value, the abnormality determination unit 4 diagnoses the power transmission mechanism as abnormal. Example implementation of the first embodiment is illustrated in FIGS. 5 and 6. In the embodiment of FIG. 5, all of the friction identification unit 1, the model torque calculation unit 2, the differential processing unit 3, and the abnormality determination unit 4 are implemented by a control central processing unit (CPU) in an target machine controller 28 that controls a control target machine 27. In the embodiment of FIG. 6, all of the friction identification unit 1, the model torque calculation unit 2, the differential processing unit 3, and the abnormality determination unit 4 are implemented by an external personal computer (PC) 31 provided outside the controller not within the target machine controller 28 that controls the control target machine 27.

Figure 7:
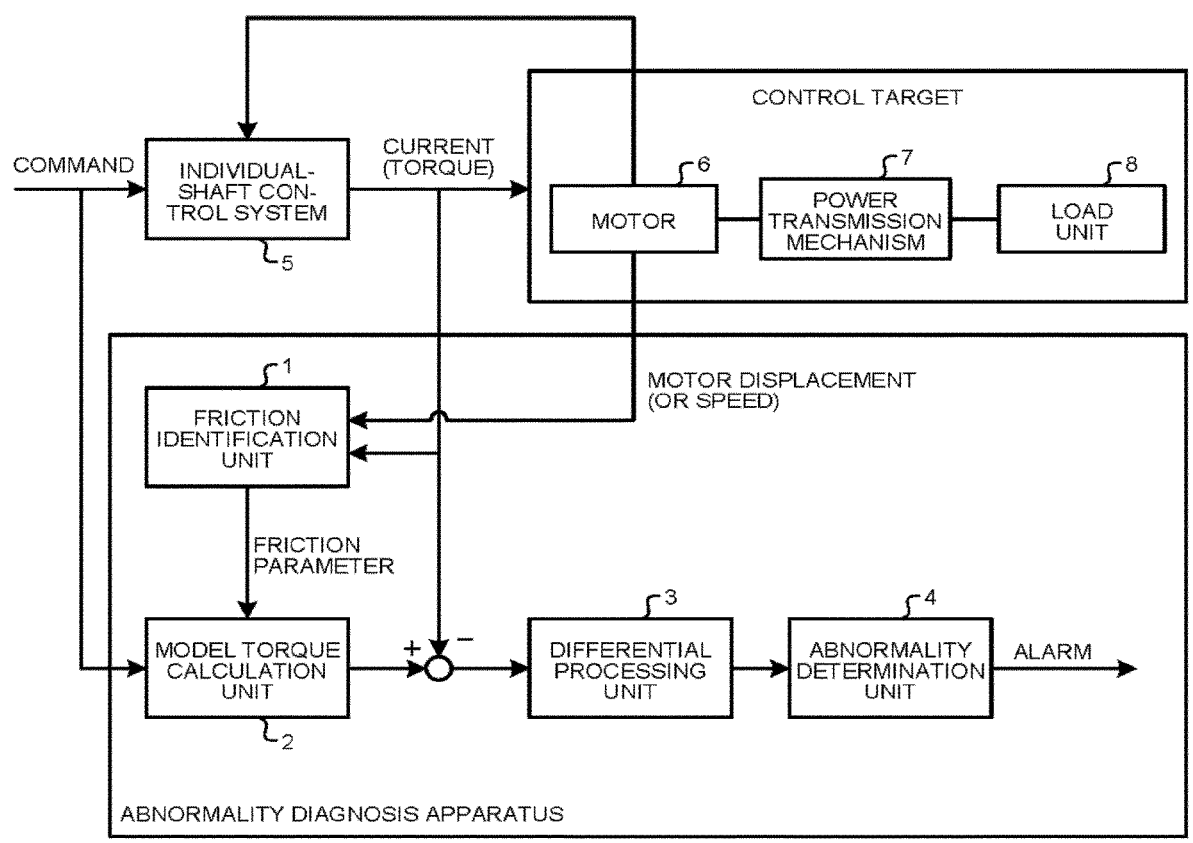
FIG. 7 is a configuration diagram in which the definition of the abnormality diagnosis apparatus is altered in the first embodiment.

While the abnormality diagnosis apparatus illustrated in FIG. 1 is defined as including the control target because the abnormality diagnosis is performed using the information on the motor 6, the abnormality diagnosis apparatus is not limited to such a configuration. The definition of the abnormality diagnosis apparatus may be altered as illustrated in FIG. 7 in which the abnormality diagnosis apparatus is defined by the friction identification unit 1, the model torque calculation unit 2, the differential processing unit 3, and the abnormality determination unit 4 without including the individual-shaft control system and the control target.

It is known that a vibration caused by reduction gears becomes gradually greater as the reduction gears deteriorate. To determine the abnormality on the basis of the vibration level caused by the reduction gears, data on operation having a small torque component other than the vibration can be used to improve the accuracy of diagnosis. Since the vibration caused by the reduction gears is correlated to the number of revolutions, using data in a section during which the number of revolutions is constant, in determining whether the reduction gears are abnormal facilitates analysis.

The characteristic of the deteriorated reduction gears may exhibit changes other than the increase in vibration caused by the reduction gears. For example, when a strain-wave gearing is increasingly worn due to its deterioration, the rigidity of the gearing is lowered. For a ball screw mechanism with a preload being applied thereto, the preload is released as the ball screw mechanism part is worn, which results in the rigidity of the ball screw mechanism being lowered. When the rigidity of the reduction gears is lowered in this manner, the vibration may be caused during acceleration or deceleration, or vibration may be caused immediately after a halt. Thus, determining, from current or torque, that the rigidity is lowered requires the determination based on current in the section during which the acceleration or deceleration is made or on current immediately after the halt. Although use of a high-pass filter such as the differentiation is effective in extracting, from a current waveform, the vibration due to the lowering of the rigidity, it is necessary to remove the influence of friction torque and acceleration/deceleration torque inherently included due to the acceleration/deceleration. The influence of the acceleration/deceleration torque can be removed by calculation when parameters such as the mass and the center of gravity of the machinery such as a robot that is the control target are known. Unfortunately, the friction torque cannot be removed in advance because the friction torque varies depending on the temperature of a joint even in machines identical to each other, which poses a problem of failure to determine with high accuracy a change in the rigidity of the machine.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, as compared with the related art, the abnormality diagnosis apparatus can early diagnose with high accuracy whether the rigidity of the power transmission mechanism 7 of the machinery is lowered.

Second Embodiment

A second embodiment differs from the first embodiment in the inside of the friction identification unit 1 and the inside of the model torque calculation unit 2. Thus, description will be made only as to the inside of the friction identification unit 1 and the inside of the model torque calculation unit 2. In the first embodiment, the sum of the Coulomb friction and the viscous friction proportional to the speed is the estimated friction. Note that the estimated friction used in the second embodiment is calculated by adding, to the sum of the Coulomb friction and the viscous friction proportional to the speed, a result of parameter identification of an approximation function that is a cause of error that could not be corrected among the moving direction friction torque and the speed friction torque used in the first embodiment. In the second embodiment, acceleration $ami$ and the speed $vmi$ of each shaft are input to the approximation function. An approximation function $fai$, which is expressed by way of example, by below equation (8) will be described.

$$fai = ka1i*ami + ka2i*vmi^{1/2} + ka3i*vmi^2 \qquad (8)$$

Note that, in the second embodiment, $fai$ may be calculated by a power function calculated by a sum of the acceleration $ami$ and the speed $vmi$ to the powers of another value. A formula used in the friction identification unit 1 is "$\tau ai = \tau mi - \tau li - fi$." $fi$ is calculated by the equation (2). Specifically, $\tau ai$ is a difference between the motor torque and an estimated motor torque estimated by using the frictional force calculated by using the friction parameters identified by equations (4) to (7), and equation (9) below is satisfied:

$$yai[k] = [ami[k], vmi[k]^{1/2}, vmi[k]^2] \qquad (9)$$

In addition, $Rai$ and $rai$ are calculated by equations (10) and (11) below, and $kpai[k]$ is calculated by equation (12) below. Note that a first element of $kpai[k]$ is an identified value $ka1i[k]$ of $ka1i$, a second element of $kpai[k]$ is an identified value $ka2i[k]$ of $ka2i$, and a third element of $kpai[k]$ is an identified value $ka3i[k]$ of $ka3i$. Specifically, $kpai$ calculated by equation (12) is obtained as a vector with three rows and one column. An element in the first row and the first column of $kpai$ is the first element. An element in the second row and the first column of $kpai$ is the second element. An element in the third row and the first column of $kpai$ is the third element. The friction identification unit 1 outputs a parameter identification result $kpai[k]$ of the approximation function in addition to the identification result $kpi[k]$ of the estimated friction that is the sum of the Coulomb friction and the viscous friction. The friction identification unit 1 according to the second embodiment outputs $kpai$ calculated by equation (12) and $kpi$ calculated by equation (7). Note that $kpai$ and $kpi$ output by the friction identification unit 1 are used as the update instruction information for updating the parameters.

$$Rai[k] = Rai[k-1] + st*(-si*Rai[k-1] + yai[k]^T yai[k]) \qquad (10)$$

$$rai[k] = rai[k-1] + st*(-si*rai[k-1] + \tau ai[k]*yai[k]^T) \qquad (11)$$

$$kpai[k] = kpai[k-1] - st*Gi(Rai[k]kpai[k-1] - rai[k]) \qquad (12)$$

In the model torque calculation unit 2, $\tau e$ is calculated by equation (13) below. In the equation, "$M(p)$" represents an inertia matrix, "$h(p,v)$" represents centrifugal force and Coriolis force, "g(p)" represents gravity, and "f(v)" represents frictional force. A vector constituted by an estimated acceleration is represented by "a". When parameters such as the mass and the center of gravity of an industrial robot that is the control target are known, M(p), h(p,v), and g(p) can be obtained by calculation.

$$\tau e = M(p)a + h(p,v) + g(p) + f(a,v) \quad (13)$$

The frictional force f(a,v) is calculated by following equation (14) where i-th shaft components of "a" and "v" are represented by "ai" and "vi", respectively, and an i-th shaft component of the frictional force f(a,v) is represented by "fi".

$$fi = k1i[k]*sgn(vi) + k2i[k]*vi + ka1i[k]*ai + ka2i[k]*vi^{1/2} + ka3i[k]*vi^2 \quad (14)$$

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Third Embodiment

A third embodiment differs from the first embodiment only in the inside of the friction identification unit 1 and in the inside of the abnormality determination unit 4. In the first embodiment, sequential identification is performed in the friction identification unit 1. In the third embodiment, the friction identification unit 1 sets a section or a period during which the abnormality determination is to be performed, and the friction identification unit 1 identifies a friction parameter by the method of least squares from driving torque, motor displacement, motor speed, and motor acceleration in the section during which the abnormality determination is performed. In the present embodiment, the friction identification unit 1 uses either a motor torque τm calculated by multiplying a measured motor current value by a torque constant or a motor torque τm detected by a torque sensor. Note that a motor displacement measurement unit such as an encoder measures a motor displacement represented by "pm", driving torque other than the frictional force calculated from time-differential vm of the motor displacement pm and time-differential am of the time-differential vm by equation (3) is represented by "τl", a difference "τdi" between τm and τl of an i-th shaft is expressed by below equation (15), and the value of a k-th identification period is expressed by "[k]".

$$\tau di = \tau mi - \tau li \quad (15)$$

The frictional force is then identified using data from the first period to the n-th period. When a vector of n rows including the element "τdi[m]" in the m-th row is represented by "Yti", a matrix of n rows and two columns including the element "sgn(vmi[m])" in the m-th row and the first column and the element "vmi[m]" in the m-th row and the second column is represented by Ai, and a pseudo inverse matrix of Ai is represented by Ai⁺, the first element of P calculated by equation (16) below is an estimated value of Coulomb friction coefficient k1i, and the second element of P is an estimated value of viscous friction coefficient k2i. Note that "n" represents the number of samples of data in each period. "m" represents a row of each of Yti and Ai. "n" and "m" are natural numbers in a range of 1≤m≤n.

$$P = Ai^+ Yti \quad (16)$$

The identified or estimated friction parameter is a fixed value in each section of abnormality determination, and the model torque calculation unit 2 computes the friction torque by using the friction parameter, thereby obtaining the model torque. The motor torque τm detected by the motor torque detection unit is subtracted from the model torque τe in the section during which the abnormality determination is performed. The abnormality determination unit 4 calculates the maximum value of the absolute value of time-differential of a result of the subtraction. When the calculated maximum value of the absolute values is equal to or larger than a reference value, the abnormality determination unit 4 diagnoses the power transmission mechanism as abnormal.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Fourth Embodiment

Figure 8:
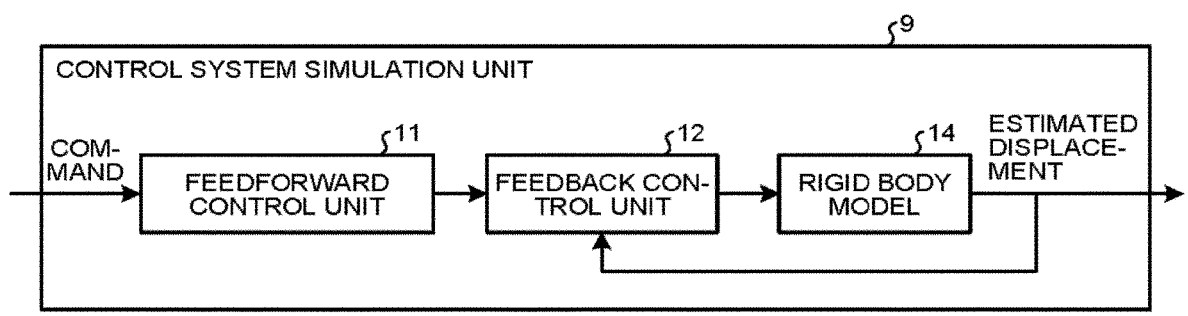
FIG. 8 is a diagram illustrating an example of a control system simulation unit according to a fourth embodiment.

A fourth embodiment differs from the first embodiment only in the inside of the control system simulation unit 9. Thus, description will be made only as to the inside of the control system simulation unit 9. In the first embodiment, the individual-shaft simplified model 13 is used as a control target model in the control system simulation unit 9. In the fourth embodiment, a unit as described below illustrated in a block diagram of FIG. 8 is used as the control system simulation unit 9. A rigid body model 14 of FIG. 8 calculates an acceleration "a" by below equation (17), where "τ" represents an output of the feedback control unit 12 and "a", "v", and "p" represent the acceleration, a speed, and a displacement, respectively, the acceleration, the speed, and the displacement being calculated in the rigid body model 14. The speed "v" is calculated by time-integration of the acceleration "a", and the displacement "p" is calculated by time-integration of the speed "v".

$$a = M(p)^{-1}(\tau - h(p,v) - g(p) - f(v)) \quad (17)$$

M(p)⁻¹ represents an inverse matrix of M(p). The control system simulation unit 9 outputs the calculated displacement "p" as the estimated displacement to the motion equation calculation unit 10. In addition, the frictional force f(v) of equation (17) is calculated using a parameter identified by the friction identification unit 1. The displacement "p" calculated by the rigid body model 14 is input as the estimated displacement to the feedback control unit 12.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Fifth Embodiment

Figure 9:
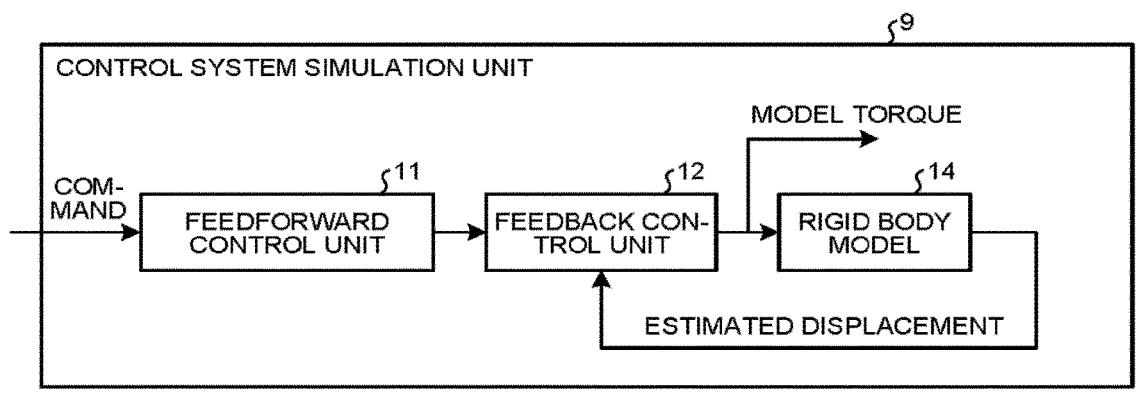
FIG. 9 is a block diagram of the inside of a model torque calculation unit in a fifth embodiment.

A fifth embodiment differs from the fourth embodiment only in the inside of the model torque calculation unit 2, and description will thus be made only as to the inside of the control system simulation unit 9 in the model torque calculation unit 2. In the fourth embodiment, the control system simulation unit 9 does not output the model torque τe that is an input to the rigid body model 14 in FIG. 9, but outputs an estimated displacement that is an output of the rigid body model 14, and the motion equation calculation unit 10 separate from the control system simulation unit 9 calculates the torque. In contrast, in the fifth embodiment, the motion equation calculation unit 10 is not provided, and an estimated displacement is input to the feedback control unit 12 from the rigid body model 14. The feedback control unit 12 calculates model torque by using the estimated displacement.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Sixth Embodiment

Figure 10:
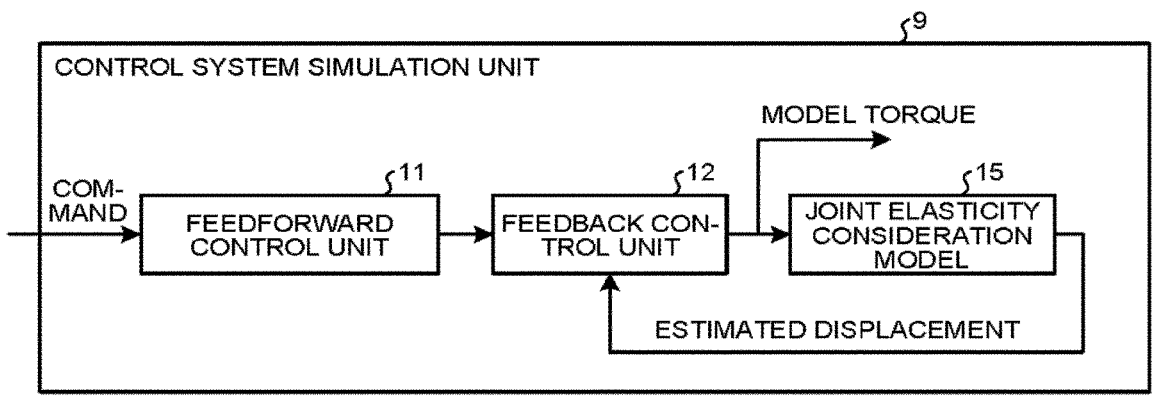
FIG. 10 is a block diagram of the inside of a model torque calculation unit in a sixth embodiment.

A sixth embodiment differs from the fifth embodiment only in the inside of the model torque calculation unit 2, and description will thus be made only as to the inside of the control system simulation unit 9 in the model torque calculation unit 2. In the fifth embodiment, the rigid body model 14 is used as a model of the control target. In the sixth embodiment illustrated in FIG. 10, a joint elasticity consideration model 15 having the characteristic of a linear spring having a constant spring constant is used as a model of the control target for a drive mechanism between the motor 6 and the power transmission mechanism 7. The joint elasticity consideration model 15, which is a model to drive a load side, provides a value obtained by multiplying the difference between displacement on the load side and displacement on the motor side by the spring constant.

In the joint elasticity consideration model 15, vectors constituted by the motor acceleration, the motor speed, and the motor displacement of each shaft are represented by am, vm, and pm, respectively, and vectors constituted by the acceleration, the speed, and the displacement on the load side that is an output shaft of the power transmission mechanism 7 are represented by al, vl, and pl, respectively. The motor acceleration "am", the load side torque "τl", and the acceleration "al" are calculated by below equations (18) to (20) where "τm" represents a vector constituted by the motor torque, "τl" represents a vector constituted by output torque of the power transmission mechanism that is load side torque, "Im" represents a diagonal matrix constituted by motor inertia moments, "f" represents a vector constituted by the friction torque, "M" represents an inertia matrix, "h" represents a vector constituted by the centrifugal force and the Coriolis force, "g" represents a vector constituted by the gravity, and "Kb" represents a diagonal matrix constituted by the spring constant of the joint of each shaft. The calculated values are sent as an estimated motor displacement to the feedback control unit 12.

$$am = Im^{-1}(\tau m - \tau l - f(vm)) \quad (18)$$

$$\tau l = Kb(pl - pm) \quad (19)$$

$$al = M(pl)^{-1}(\tau l - h(pl, vl) - g(pl)) \quad (20)$$

In addition, the motor speed vm is calculated by time-integration of each element of the motor acceleration am, the motor displacement pm is calculated by time-integration of each element of the motor speed vm, the speed vl is calculated by time-integration of each element of the acceleration al, and the displacement pl is calculated by time-integration of each element of the speed vl. Note that Im−1 and $M(pl)^{-1}$ represent inverse matrices of Im and M(pl), respectively.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Seventh Embodiment

Figure 11:
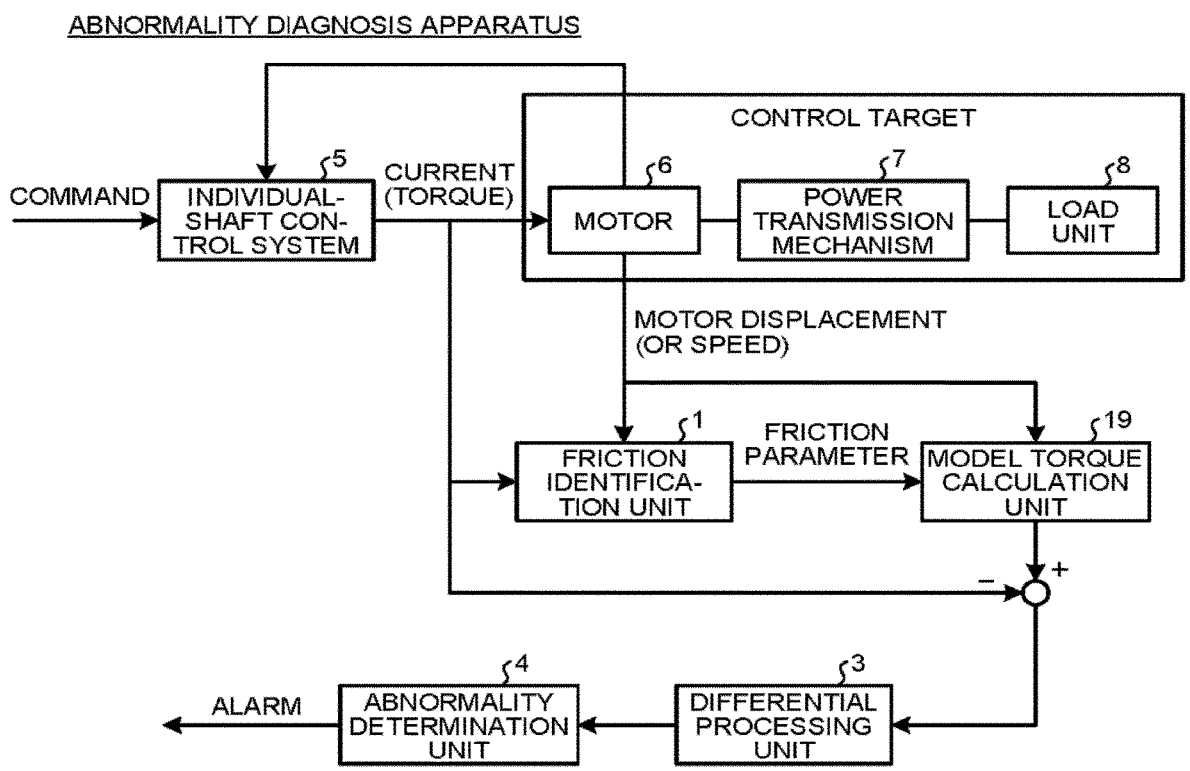
FIG. 11 is a block diagram of an abnormality diagnosis apparatus of a seventh embodiment.

A block diagram of an abnormality diagnosis apparatus according to a seventh embodiment is illustrated in FIG. 11. The seventh embodiment differs from the first embodiment in the inside of the model torque calculation unit 19, and thus description will be made as to the model torque calculation unit 19. An input to the model torque calculation unit 19 is not a command given to each shaft, but is a motor displacement. Unlike the first embodiment, thus, the model torque calculation unit 19 includes only the motion equation calculation unit 10 without the control system simulation unit 9. Since the inside of the motion equation calculation unit 10 is the same as that in the first embodiment, the description thereof will be omitted. In addition, since the inside of the friction identification unit 1 and the inside of the abnormality determination unit 4 are also the same as those in the first embodiment, the description thereof will be omitted.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Eighth Embodiment

Figure 12:
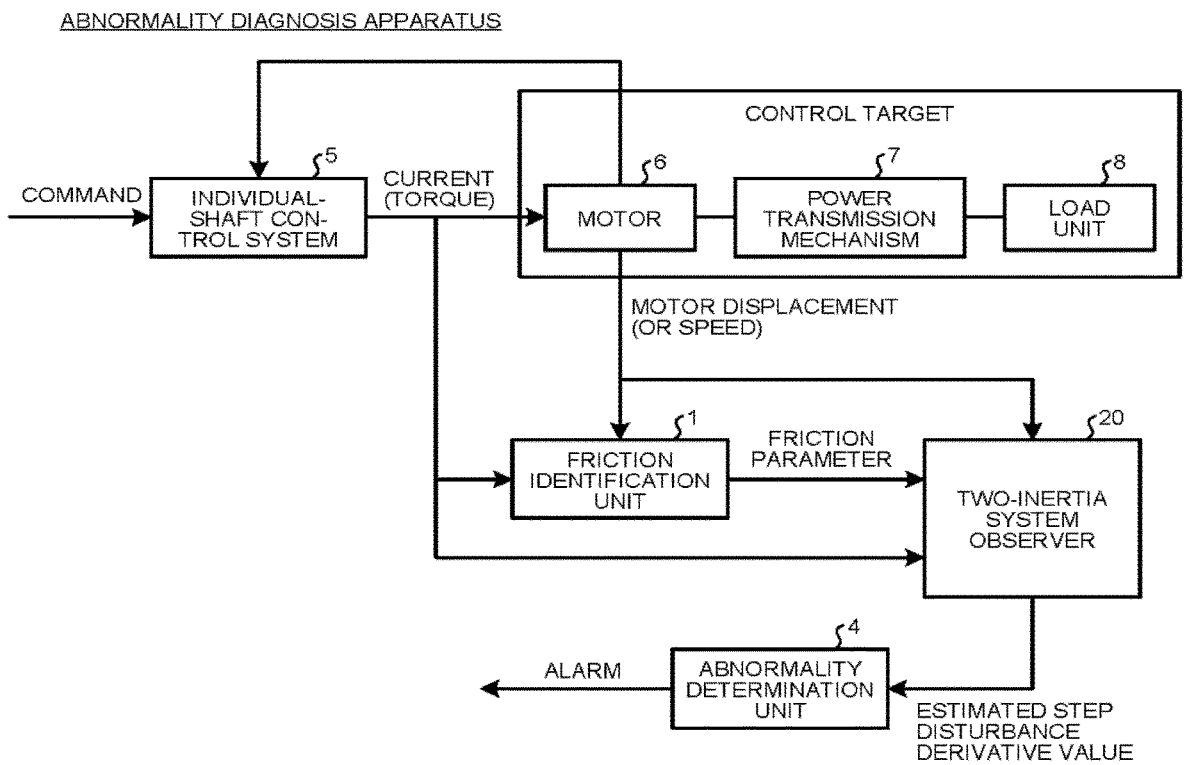
FIG. 12 is a block diagram of an abnormality diagnosis apparatus of an eighth embodiment.

A block diagram of an abnormality diagnosis apparatus according to an eighth embodiment is illustrated in FIG. 12. The motor torque, the motor speed, and the friction parameter identified by the friction identification unit 1 are input to a two-inertia system observer 20. In the two-inertia system observer 20, friction torque is calculated from the friction parameter and the motor speed, and the calculated friction torque is subtracted from the motor torque, so that motor torque having the influence of the friction torque removed is obtained. The motor torque having the influence of the friction torque removed, and the motor speed are input to an observer main unit in the two-inertia system observer 20.

The observer main unit is an observer for a two-inertia system constituted by a motor, a spring, and a load. The observer for the two-inertia system according to the present embodiment is a full-order observer using a motor speed, a load rate, a torsion amount, and a step disturbance as state variables, and outputs time-derivative of an estimated step disturbance as an estimated step-disturbance derivative-value. Note that the time-derivative of the estimated step disturbance refers to a value used for calculation of a state variable that is obtained by integration of a derivative value of the state variable calculated in the observer.

When the motor speed, an estimated motor speed, an estimated load rate, an estimated torsion amount, and an estimated disturbance of an i-th axis are represented by vmi, hvmi, hvli, hpdi, and htdi, respectively, a derivative value dhvmi of the estimated motor speed, a derivative value dhvli of the estimated load rate, a derivative value dhpdi of the estimated torsion amount, and a derivative value dhtdi of the estimated step disturbance, which are calculated in the observer, are obtained by below equations (21), (22), (23), and (24), respectively. In the equations, Jmi, Jli, and Kbi represent a motor inertia moment, a load inertia moment, and a spring constant, respectively, and G1i, G2i, G3i, and G4i represent observer gains.

$$dhvmi=(\tau mi-fi-Kbi*hpdi)/Jmi+G1i*(vmi-hvmi) \quad (21)$$

$$dhvli=(Kbi*hpdi+htdi)+G2i*(vmi-hvmi) \quad (22)$$

$$dhpdi=(hvmi-hvli)+G3i*(vmi-hvmi) \quad (23)$$

$$dhtdi=G4i*(vmi-hvmi) \quad (24)$$

Figure 13:
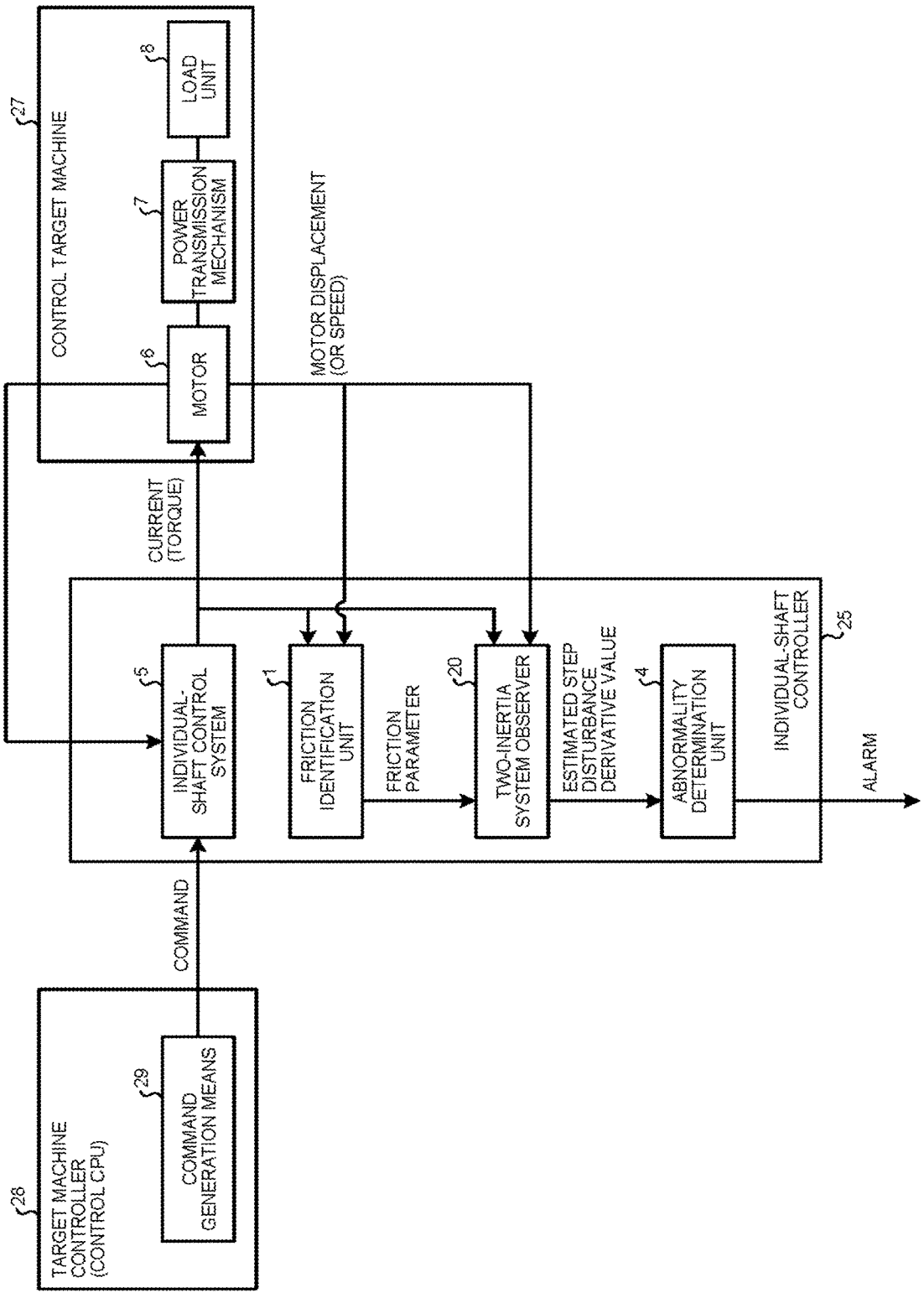
FIG. 13 is a diagram illustrating example implementation of the abnormality diagnosis apparatus in the eighth embodiment.

Since the derivative value dhtdi of the estimated step disturbance output from the two-inertia system observer 20 corresponds to a difference resulting from subtraction of the motor torque from the model torque, the output of the two-inertia system observer 20 is input to the abnormality determination unit 4. Since the inside of the friction identification unit 1 and the inside of the abnormality determination unit 4 are the same as those in the first embodiment, the description thereof will be omitted. Example implementation of the eighth embodiment is illustrated in FIG. 13. The friction identification unit 1, the two-inertia system observer 20, and the abnormality determination unit 4 are implemented by a CPU included in an individual-shaft controller 25 that controls the motor 6 for driving the corresponding shaft. Alternatively, the friction identification unit 1, the two-inertia system observer 20, and the abnormality determination unit 4 may be implemented by a controller CPU of the target machine controller 28 that controls the control target machine 27. While the above embodiment is described with reference to the full-order observer, a minimum-order observer or another observer that uses torsion torque as a state quantity may be used.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Ninth Embodiment

Figure 14:
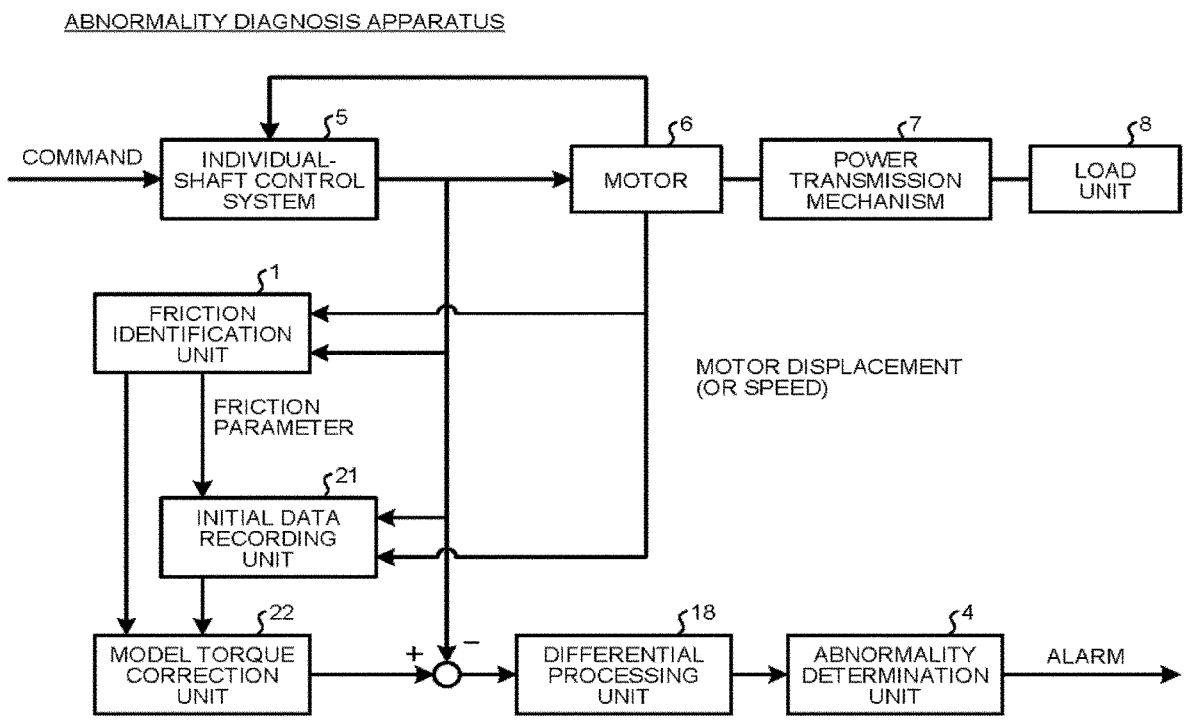
FIG. 14 is a block diagram of an abnormality diagnosis apparatus of a ninth embodiment.

A block diagram of an abnormality diagnosis apparatus according to a ninth embodiment is illustrated in FIG. 14. In the ninth embodiment, determination of abnormality is made from data on repeated operation. Operation data, which is operation information on the machinery under normal operation, is recorded in an initial data recording unit 21 that functions as a storage unit. Examples of operation data during the normal operation include motor torque and motor displacement during the normal operation. The data recorded in the initial data recording unit 21 are also input to the friction identification unit 1, such that a friction parameter is calculated from the operation recorded as the initial data, and the calculated friction parameter is also recorded as an initial friction parameter into the initial data recording unit 21. The inside of the friction identification unit 1 is similar to that in the third embodiment, and the friction parameter is identified in a batch from the operation data during the normal operation recorded in the initial data recording unit 21.

In abnormality diagnosis, when the same operation as recorded in the initial data recording unit 21 is to be performed, a current friction parameter is calculated by the friction identification unit 1. The motor torque during the normal operation and the friction parameter during the normal operation, which are recorded in the initial data recording unit 21, and the motor displacement and the current friction parameter input from the friction identification unit 1 are input to a model torque correction unit 22. In the model torque correction unit 22, the motor speed when the same operation as recorded in the initial data recording unit 21 is performed is calculated, the friction torque calculated using the friction parameter during the normal operation is subtracted from the recorded motor torque during the normal operation, and the friction torque calculated using the current friction parameter is added to the result of the subtraction, with the result that the model torque is calculated. Since the inside of the abnormality determination unit 4 is the same as that in the first embodiment, the description thereof will be omitted.

Figure 15:
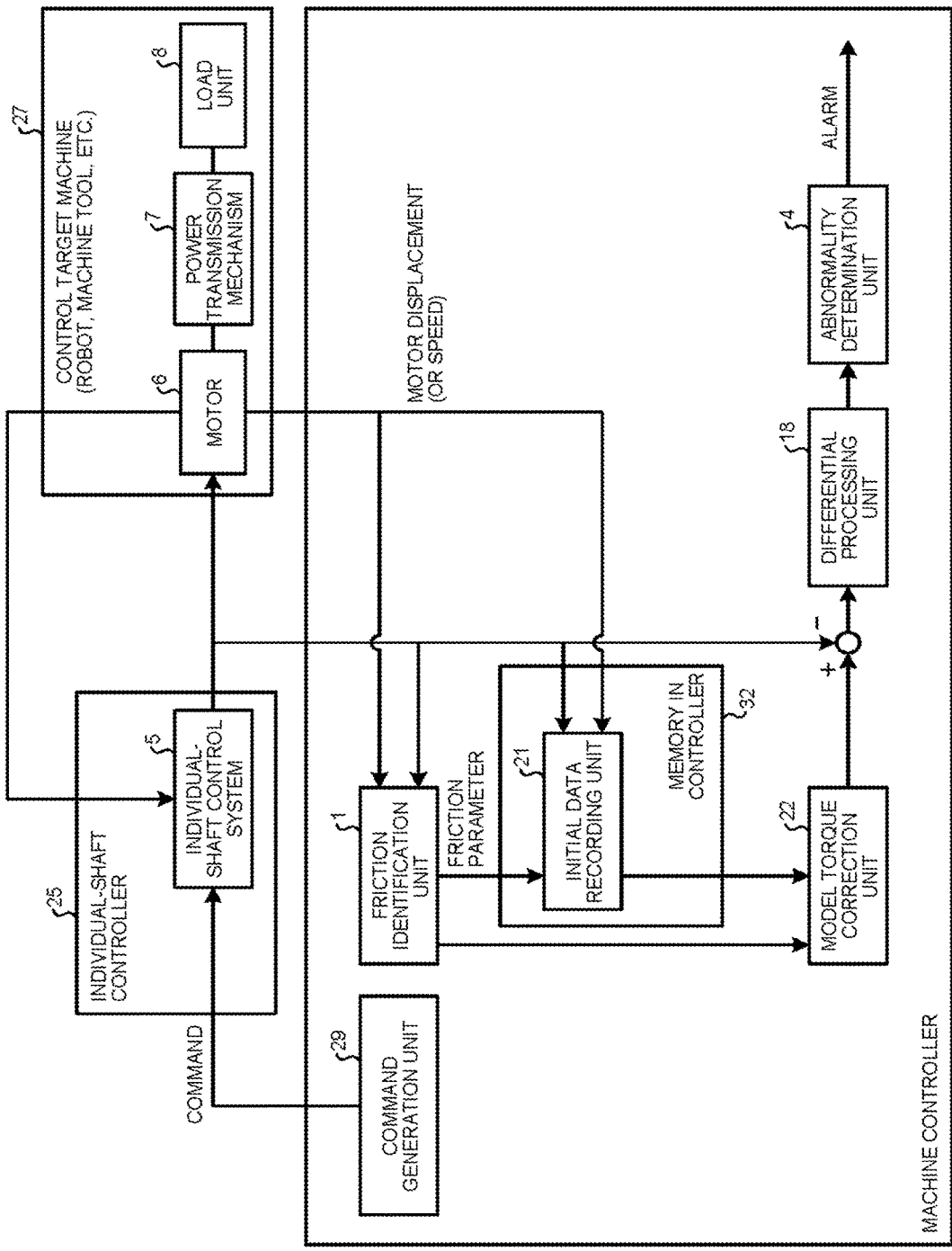
FIG. 15 is a diagram illustrating first example implementation of the abnormality diagnosis apparatus in the ninth embodiment.
Figure 16:
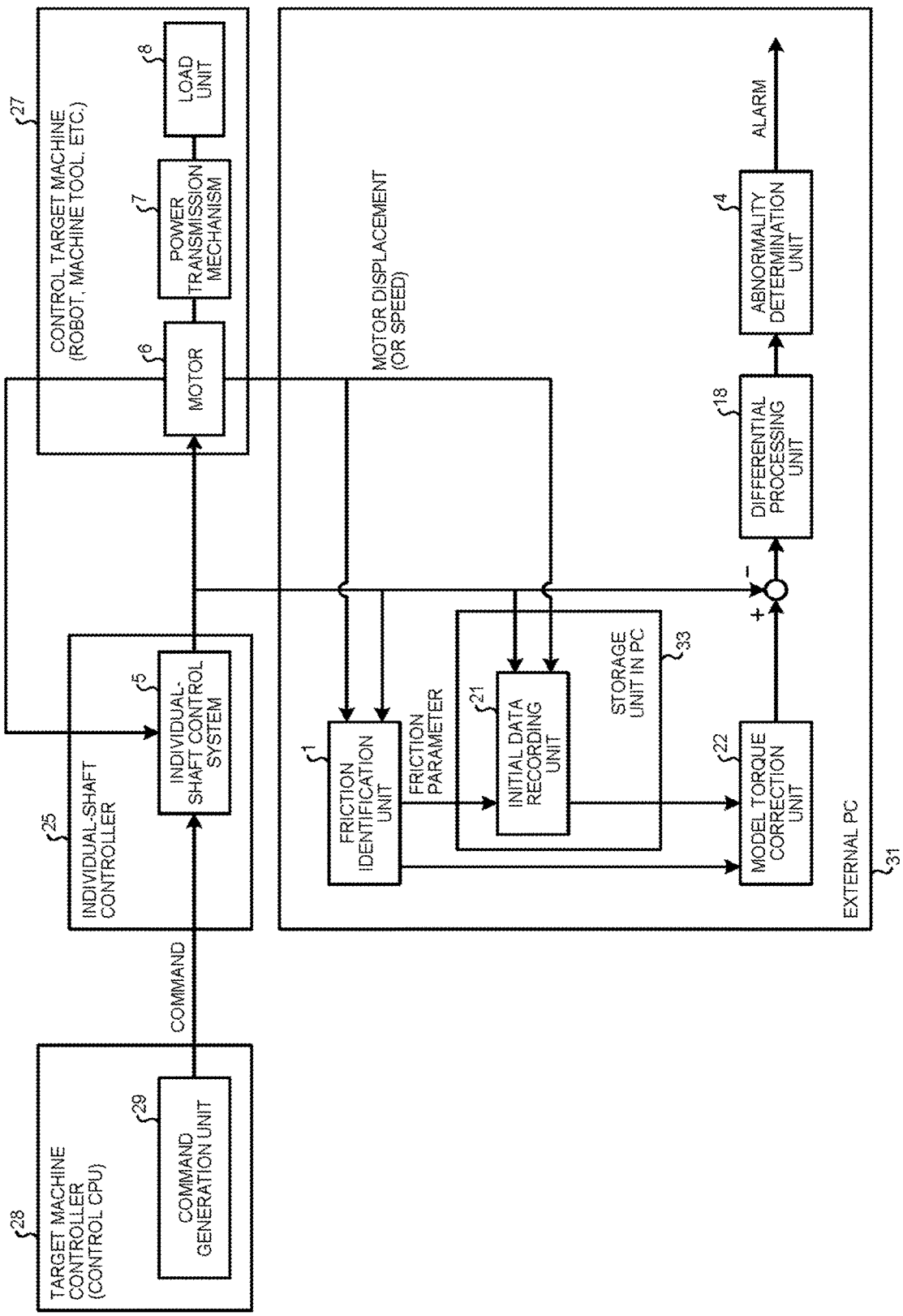
FIG. 16 is a diagram illustrating second example implementation of the abnormality diagnosis apparatus in the ninth embodiment.

Example implementation of the ninth embodiment is illustrated in FIGS. 15 and 16. In FIG. 15, the friction identification unit 1, the model torque correction unit 22, the differential processing unit 18, and the abnormality determination unit 4 are implemented by a control CPU of the target machine controller 28, and the initial data recording unit 21 records data in a memory 32 included in the controller. In FIG. 16, the friction identification unit 1, the model torque correction unit 22, the differential processing unit 18, and the abnormality determination unit 4 are implemented as software by the external PC 31 outside the target machine controller 28. The data stored in the initial data recording unit 21 are recorded in a storage unit 33 of the external PC 31.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current even when the control target includes factors that are impediment to the modeling. As a result, the abnormality diagnosis apparatus can early diagnose whether the power transmission mechanism 7 deteriorates.

Tenth Embodiment

Figure 17:
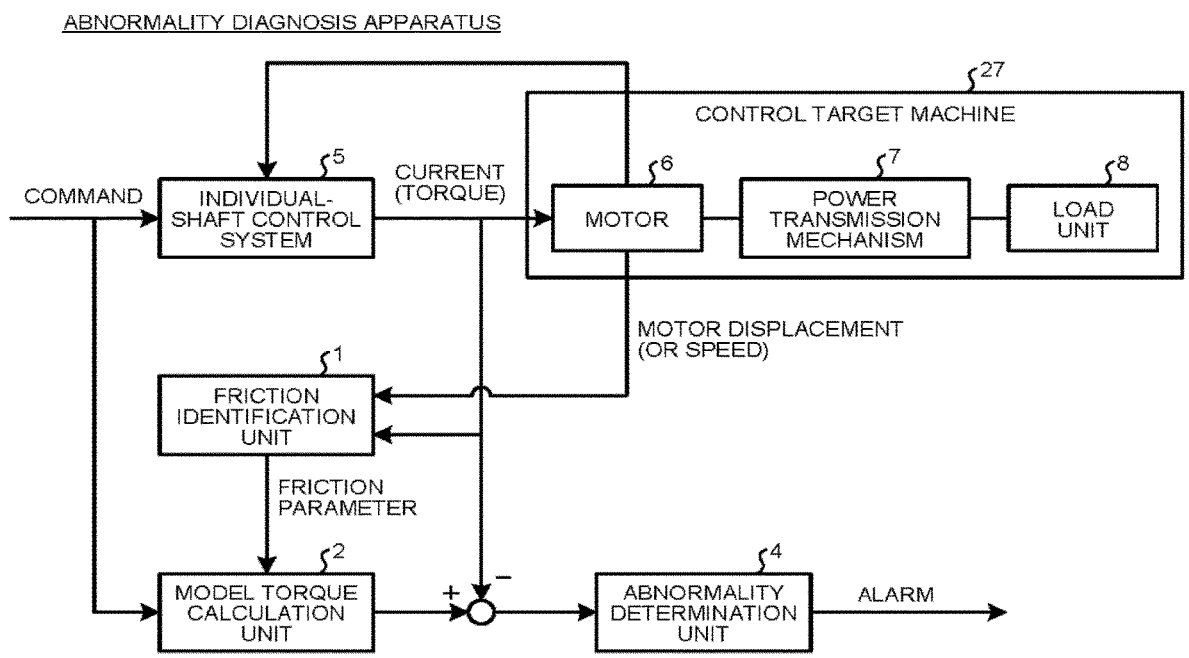
FIG. 17 is a block diagram of an abnormality diagnosis apparatus of a tenth embodiment.

A block diagram of an abnormality diagnosis apparatus according to a tenth embodiment is illustrated in FIG. 17. The tenth embodiment differs from the first embodiment in that the result of subtraction of the motor torque from the model torque is input to the abnormality determination unit 4 without passing through a high-pass filter such as the differential processing unit 3. Since the tenth embodiment is the same as the first embodiment except for the above, the description thereof will be omitted.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Eleventh Embodiment

In an eleventh embodiment, the abnormality diagnosis apparatus illustrated in the block diagram of FIG. 1 is used. Since the eleventh embodiment differs from the first embodiment only in the inside of the abnormality determination unit 4, description will be made only as to the inside of the abnormality determination unit 4. In the eleventh embodiment, the average value of the absolute values of input is used for abnormality determination. The average value may be calculated in a specified section, or may be calculated in each predetermined period. When the calculated average value is larger than a reference value, the power transmission mechanism is diagnosed as abnormal.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Twelfth Embodiment

In a twelfth embodiment, the abnormality diagnosis apparatus illustrated in the block diagram of FIG. 1 is used. Since the twelfth embodiment differs from the first embodiment only in the inside of the abnormality determination unit 4, description will be made only as to the inside of the abnormality determination unit 4. In the twelfth embodiment, the abnormality determination unit 4 includes a non-dimensional symptom parameter calculation unit that calculates a non-dimensional symptom parameter. The non-dimensional symptom parameter is used for determination of abnormality of the power transmission mechanism 7. Examples of the non-dimensional symptom parameter include a form factor, an impact index, a crest factor, a skewness, and a kurtosis. The non-dimensional symptom parameter calculation unit calculates at least one of these non-dimensional symptom parameters in a specified section or in each predetermined period. The abnormality determination unit 4 has a predetermined threshold, and compares the calculated non-dimensional symptom parameter with the threshold to thereby diagnose whether the power transmission mechanism 7 is abnormal.

The form factor can be calculated by dividing a standard deviation by the average of the absolute values. The impact index can be calculated by dividing a peak value by the standard deviation. The peak value is an average value of the largest ten absolute values of time-series data. The crest factor can be calculated by dividing the peak value by the average value of the absolute values. The skewness, which is a positive or negative value representing the degree of distortion of the vibration waveform with the average value being centered, can be calculated by below equation (25) where the average value of the absolute values of the time-series data Xi is represented by Xa and the standard deviation is represented by $X_{rms}$.

[Formula 1]

$$\text{Skewness} = \left\{ \sum_{i=1}^{N} (|X_i| - X_a)^3 \right\} / (N-1) / X_{rms}^3 \qquad (25)$$

Note that N represents the number of pieces of time-series data. The kurtosis is a value representing how impulsive a waveform is, and can be calculated by equation (26) below.

[Formula 2]

$$\text{Kurtosis} = \left\{ \sum_{i=1}^{N} (|X_i| - X_a)^4 \right\} / (N-1) / X_{rms}^4 \qquad (26)$$

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Thirteenth Embodiment

In a thirteenth embodiment, the abnormality diagnosis apparatus illustrated in the block diagram of FIG. 1 is used. Since the thirteenth embodiment differs from the first embodiment only in the inside of the abnormality determination unit 4, description will be made only as to the inside of the abnormality determination unit 4. In the thirteenth embodiment, frequency analysis is used for abnormality determination. Whether the power transmission mechanism is abnormal is diagnosed from transition of peak frequency of a frequency analysis result. Specifically, 16 Hz is set as a reference value, in which case the power transmission mechanism is diagnosed as abnormal when the peak frequency, which was 20 Hz in a normal condition immediately after start of operation, has gradually lowered to a value equal to or lower than the reference value.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Fourteenth Embodiment

In a fourteenth embodiment, the abnormality diagnosis apparatus illustrated in the block diagram of FIG. 1 is used. Since the fourteenth embodiment differs from the first embodiment only in the inside of the abnormality determination unit 4, description will be made only as to the inside of the abnormality determination unit 4. In the fourteenth embodiment, an output of a bandpass filter is used for abnormality determination. Specifically, the bandpass filter has a characteristic of allowing passage of only signal components of a preset frequency. In this case, the abnormality determination unit 4 determines the power transmission mechanism as abnormal when the maximum value of the absolute values of the outputs from the bandpass filer has become equal to or larger than a reference value.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Fifteenth Embodiment

Figure 18:
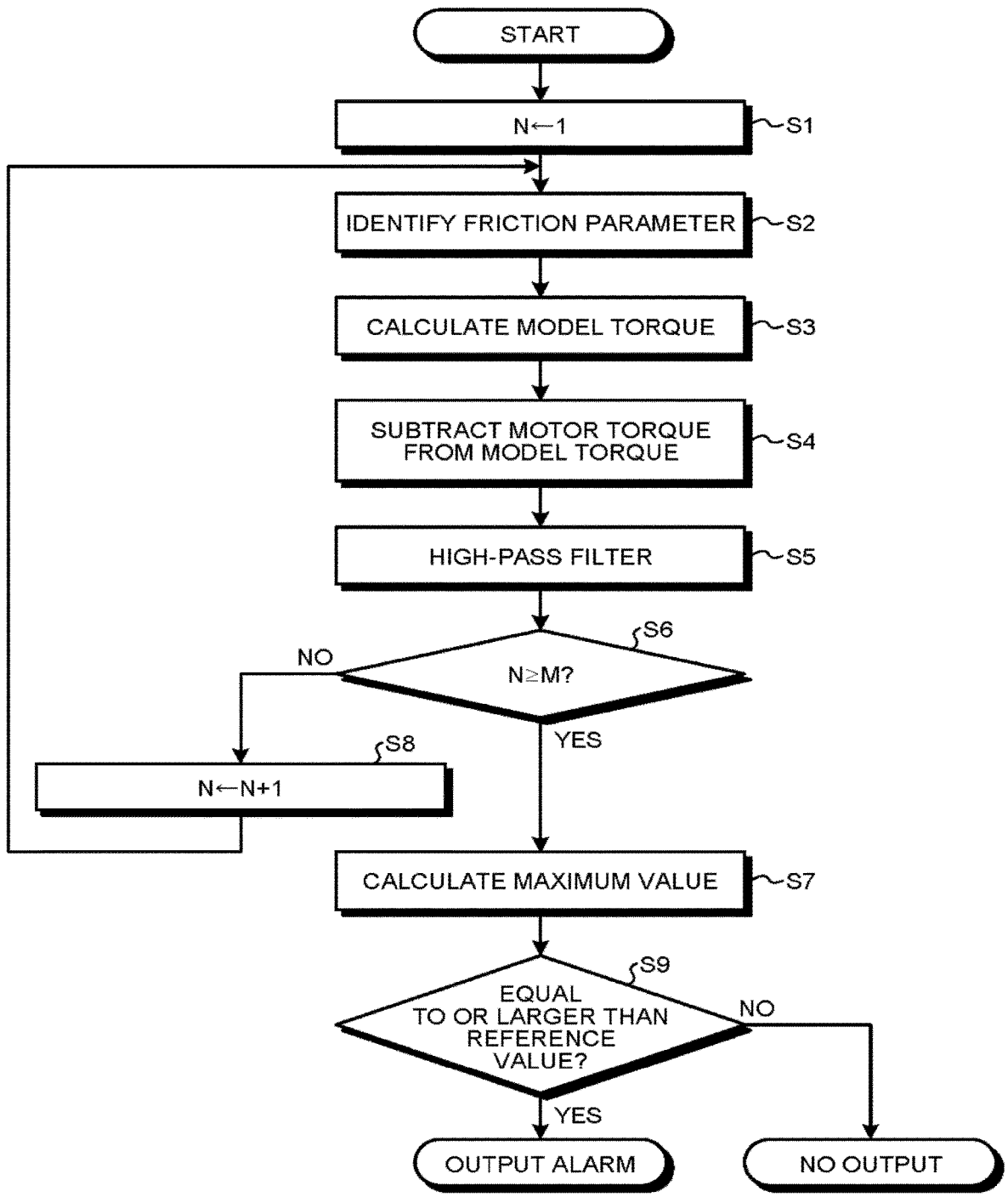
FIG. 18 is a flowchart of an abnormality diagnosis method of a fifteenth embodiment.

A flowchart of an abnormality diagnosis method of a fifteenth embodiment is illustrated in FIG. 18. The friction identification unit 1 initializes a count, that is, resets N to 1, and identifies a friction parameter (steps S1 and S2). The identification of the friction parameter is similar to that in the friction identification unit 1 of the first embodiment. The model torque calculation unit 2 calculates model torque (step S3). The calculation of the model torque is also the same as that in the model torque calculation unit 2 of the first embodiment. The differential processing unit 3 allows the result of the subtraction of the motor torque from the model torque to pass through a high-pass filter such as time-differential (steps S4 and S5). If a specified period has not been reached, the processes in steps S2 to S5 are repeated. The abnormality determination unit 4 determines whether a predetermined period has been reached, and, if the predetermined period has been reached, outputs the maximum value of the absolute values of the high-pass filter output (steps S6 and S7). The abnormality determination unit 4 determines whether the calculated maximum value of the absolute values is equal to or larger than a reference value (step S9). If the maximum value is determined to be equal to or larger than the reference value, abnormality determination unit 4 outputs an alarm and determines that the power transmission mechanism 7 is abnormal.

The abnormality diagnosis apparatus according to the present embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Sixteenth Embodiment

Figure 19:
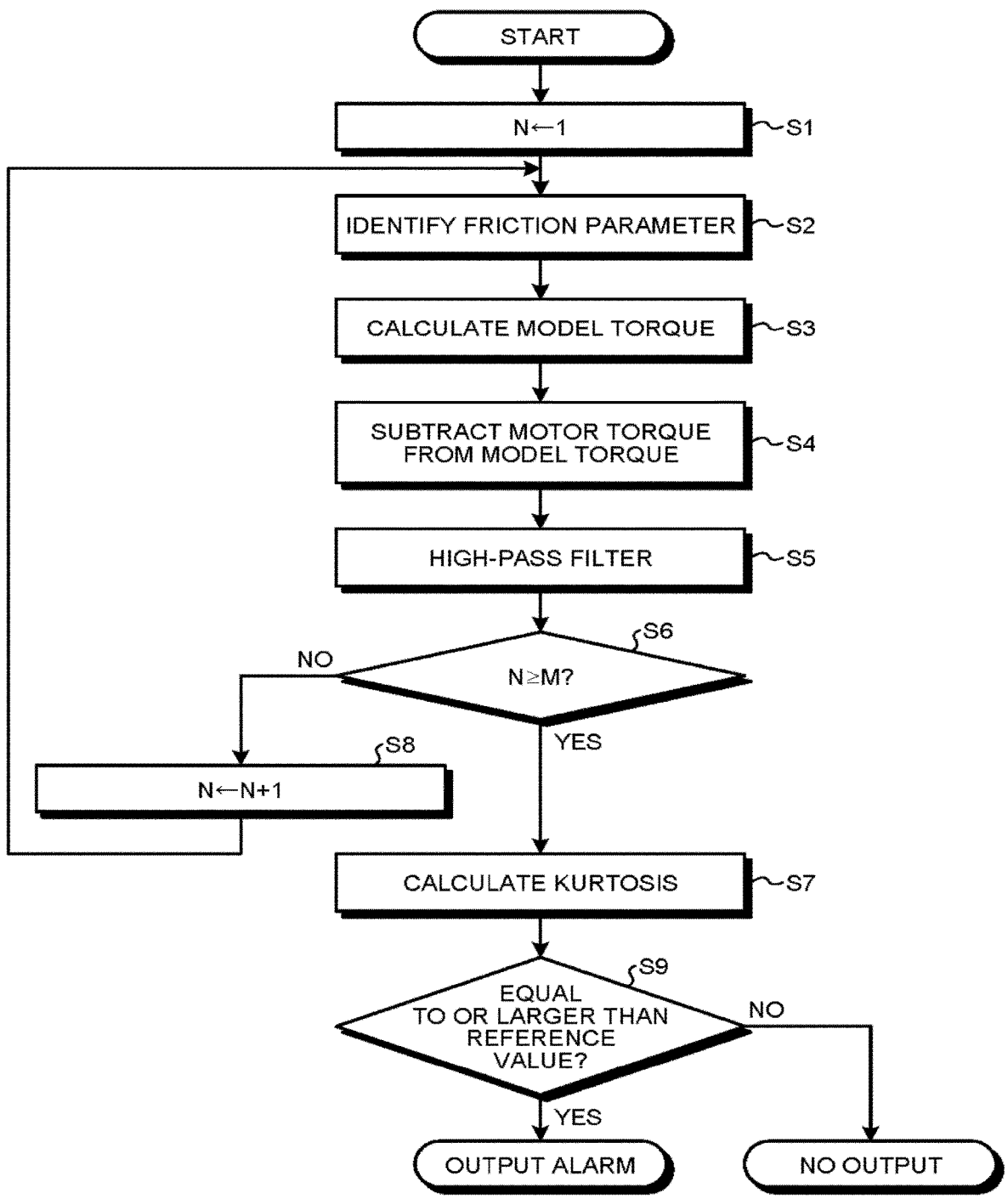
FIG. 19 is a flowchart of an abnormality diagnosis method of a sixteenth embodiment.

A flowchart of an abnormality diagnosis method of a sixteenth embodiment is illustrated in FIG. 19. The friction identification unit 1 initializes a count, that is, resets N to 1, and identifies a friction parameter (steps S1 and S2). Note that the identification of the friction parameter is similar to that in the friction identification unit 1 of the first embodiment. The model torque calculation unit 2 calculates model torque (step S3). The calculation of the model torque is also the same as that in the model torque calculation unit 2 of the first embodiment. The differential processing unit 3 allows the result of subtraction of the motor torque from the model torque to pass through a high-pass filter such as time-differential (steps S4 and S5). If a specified period has not been reached, the processes in steps S2 to S5 are repeated. The abnormality determination unit 4 determines whether a predetermined period has been reached, and, if the predetermined period has been reached, calculates the kurtosis of the high-pass filter output (steps S6 and S7). If the calculated kurtosis is determined to be equal to or larger than a reference value, the abnormality determination unit 4 outputs an alarm and determines that the power transmission mechanism 7 is abnormal (step S9).

The abnormality diagnosis apparatus according to the sixteenth embodiment reduces the influence of a change in friction that is a change in the characteristic, such that the abnormality diagnosis apparatus can diagnose with high accuracy whether the power transmission mechanism 7 is abnormal. In addition, the abnormality diagnosis apparatus according to the present embodiment detects with high accuracy a change in the motor current caused by the lowering of the rigidity of the machinery caused by deterioration of the power transmission mechanism 7. As a result, the abnormality diagnosis apparatus can early diagnose whether the power transmission mechanism 7 deteriorates.

Seventeenth Embodiment

Figure 20:
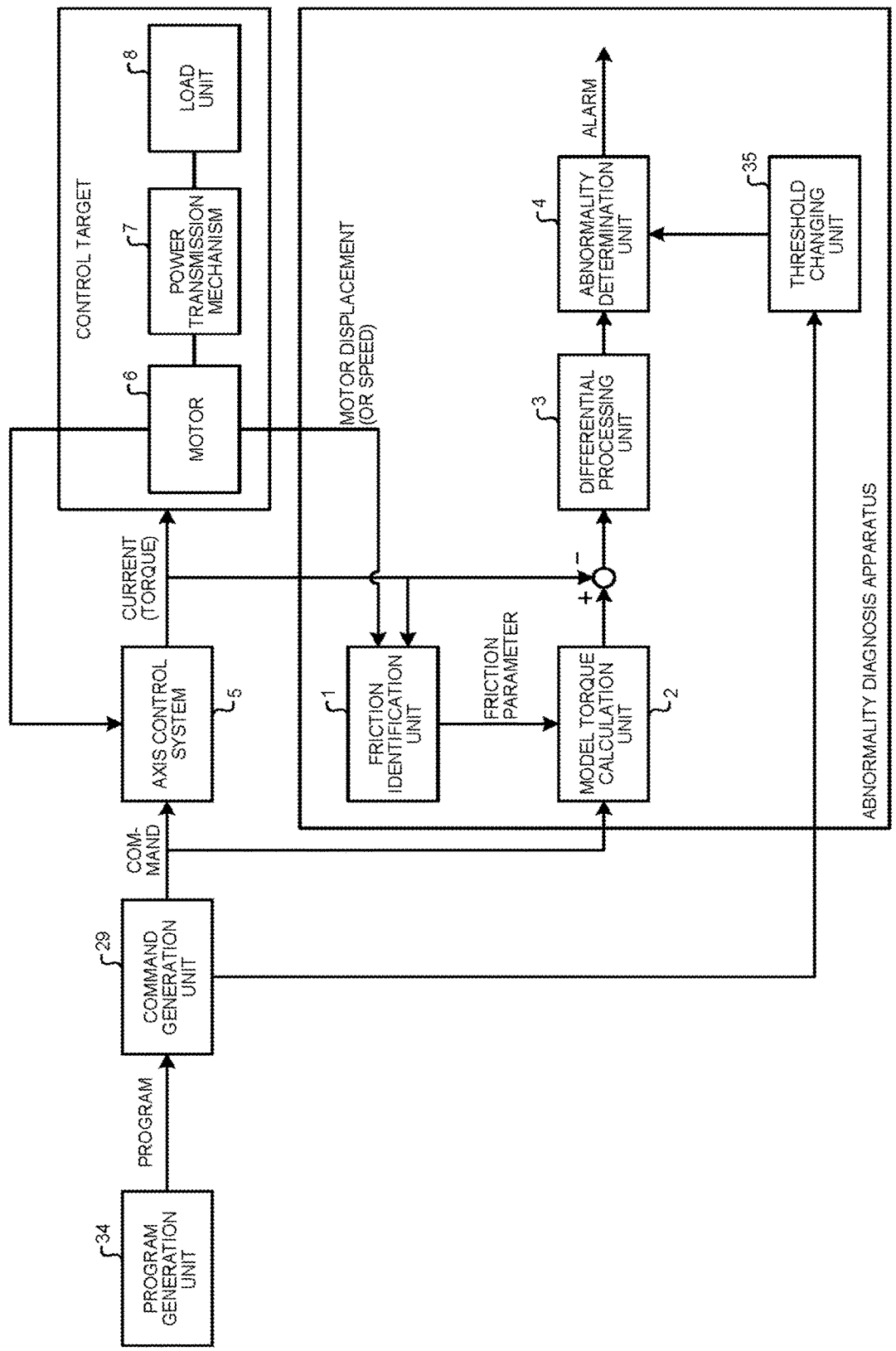
FIG. 20 is a diagram illustrating a configuration of an abnormality diagnosis apparatus of a seventeenth embodiment.

FIG. 20 is a diagram illustrating a configuration of an abnormality diagnosis apparatus of a seventeenth embodiment. Since the abnormality diagnosis apparatus of the seventeenth embodiment have the same components as those of the first embodiment except for a program generation unit 34 and a threshold changing unit 35, descriptions of the same components will be omitted. The program generation unit 34 generates programs for operating a control target such as an industrial robot or a machine tool. On the basis of operation instructions described in the programs generated by the program generation unit 34, a command generation unit 29 generates commands at every moment for operating the control target. The commands at every moment are position commands for each shaft.

The commands at every moment are input to the individual shaft control system 5 and also input to the threshold changing unit 35. The threshold changing unit 35 determines a threshold on the basis of the input commands at every moment. For example, the threshold changing unit 35 stores two kinds of thresholds therein. These thresholds are thresholds for making abnormality determination. From a position command for each shaft, then, the threshold changing unit 35 calculates a speed command and an acceleration command for the corresponding shaft. When the speed command and the acceleration command are equal to or smaller than respective specified values, the threshold changing unit 35 selects and outputs the threshold having a smaller value. When the condition that the speed command and the acceleration command are equal to or smaller than the respective specified values is not satisfied, the threshold changing unit 35 selects and outputs the threshold having a larger value.

The change of the threshold may be made by switching between three or more values instead of switching between two values. The threshold may be changed among continuous values. In addition, the threshold may be changed depending on whether the position is near a particular position rather than on the basis of the speed and the acceleration. The threshold changing unit 35 may change the threshold in the abnormality determination unit 4.

Eighteenth Embodiment

Figure 21:
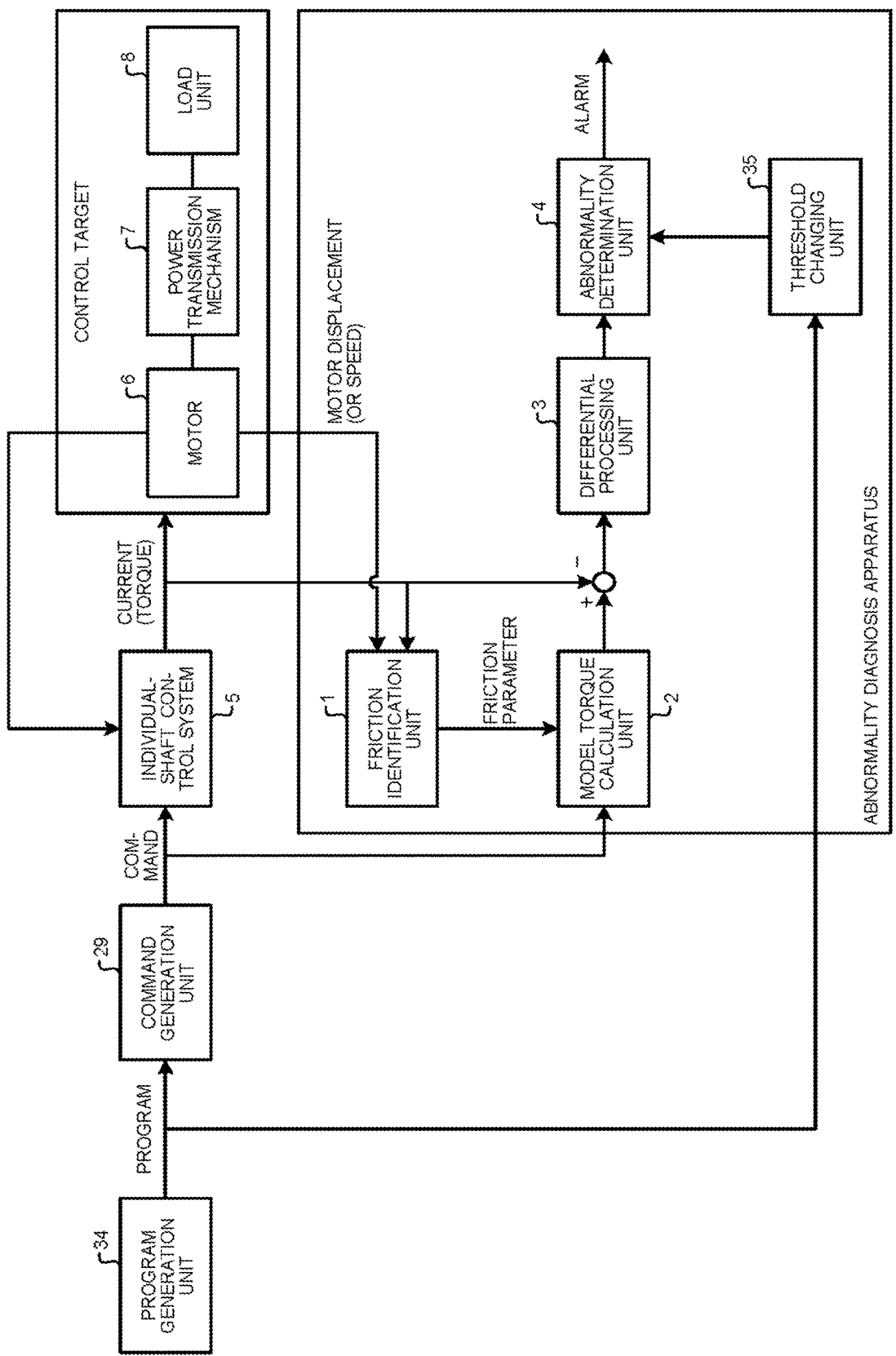
FIG. 21 is a diagram illustrating a configuration of an abnormality diagnosis apparatus of an eighteenth embodiment.

FIG. 21 is a diagram illustrating an example configuration of an abnormality diagnosis apparatus of an eighteenth embodiment. Since the abnormality diagnosis apparatus of the eighteenth embodiment have the same components as those of the first embodiment except for a program generation unit 34 and a threshold changing unit 35, descriptions of the same components will be omitted. The program generation unit 34 generates programs for operating a control target such as an industrial robot or a machine tool. In the program generated by the program generation unit 34, operation instructions for operating the control target such as the industrial robot or the machine tool operate are described. Also, a setting of sensitivity of abnormality determination or a threshold in the abnormality determination unit 4 when the control target is operated in accordance with these operation instructions is described in the program generated by the program generation unit 34.

On the basis of the operation instructions described in the programs generated by the program generation unit 34, the command generation unit 29 generates commands at every moment for operating the control target, that is, generates position commands for each shaft. The commands at every moment are input to the individual-shaft control system 5. On the basis of the threshold of abnormality determination or the sensitivity described in the program generated by the program generation unit 34, the threshold changing unit 35 changes the threshold which the abnormality determination unit 4 uses for abnormality determination. In a case where the threshold is described in the program, the threshold changing unit 35 switches the threshold to the threshold specified in the program. In a case where the sensitivity is specified in the program, the threshold changing unit 35 changes the threshold held therein, in accordance with the sensitivity, and outputs the changed threshold to the abnormality determination unit 4. The threshold changing unit 35 may change the threshold in the abnormality determination unit 4.

Figure 22:
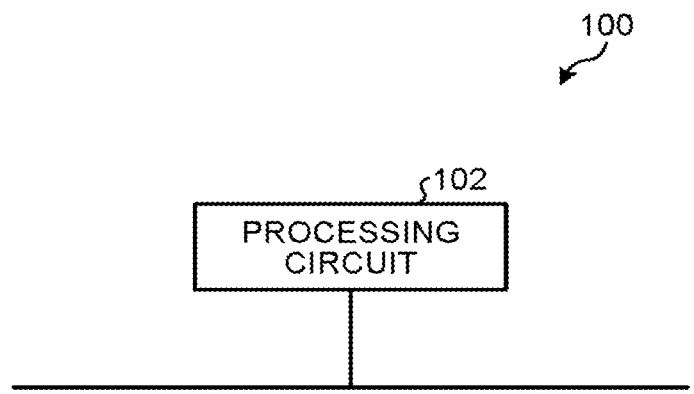
FIG. 22 is a hardware configuration diagram of the first to eighteenth embodiments.

Each of the embodiments is achieved by implementing the main unit of the target machine controller 28 by a control CPU. Alternatively, each of the embodiments may be achieved by installing software that functions as the respective components of the abnormality diagnosis apparatus in the external PC 31 outside the target machine controller 28. Here, a hardware configuration of the external PC 31 that executes the software will be described with reference to FIGS. 22 and 23. The external PC 31 according to the embodiments can be implemented by hardware 100 and a processing circuit 102 illustrated in FIG. 22. Namely, the abnormality diagnosis apparatus includes a processing device for: calculating the friction parameter; calculating the motor torque by using the calculated friction parameter; detecting the motor torque of the motor; and, on the basis of the result of comparison between the model torque and the motor torque, diagnosing whether abnormality of the power transmission mechanism 7 is abnormal. The processing circuit 102 may be dedicated hardware or may be a central processing unit (CPU; also referred to as a central processor, a processing unit, a computing unit, a microprocessor, a microcomputer, a processor, or a digital signal processor (DSP)) that executes programs stored in a memory.

In a case where the processing circuit 102 is dedicated hardware, the processing circuit 102 is a single circuit, a composite circuit, a programmed processor, a parallel-programmed processor, an application specific integrated circuit (ASIC), a field programmable gate array (FPGA), or a combination thereof, for example. The friction identification unit 1, the model torque calculation unit 2, the motor torque detection unit, and the abnormality determination unit 4 may be each implemented by a processing circuit 102, or the functions of the respective components may be collectively implemented by one processing circuit.

Figure 23:
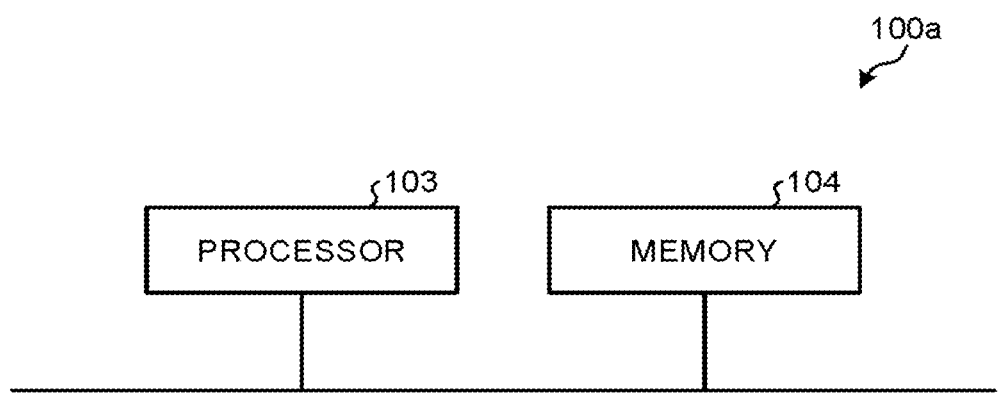
FIG. 23 is a hardware configuration diagram of the first to eighteenth embodiments.

In a case where the processing circuit 102 is a CPU, the abnormality diagnosis apparatus can be implemented by hardware 100a illustrated in FIG. 23, that is, a processor 103 and a memory 104 connected to the abnormality diagnosis apparatus. In this case, the friction identification unit 1, the model torque calculation unit 2, the motor torque detection unit, and the abnormality determination unit 4 are implemented by software, firmware, or a combination of software and firmware. The software and firmware are described in the form of programs and stored in the memory 104. The processor 103 implements the functions of the respective components by reading and executing the programs stored in the memory 104. Namely, the abnormality diagnosis apparatus includes a memory for storing programs, which, when executed by the processing circuit, results in execution of a step of performing identification processing, a step of calculating the model torque, a step of detecting the motor torque, and a step of diagnosing whether the power transmission mechanism 7 is abnormal. In other words, these programs cause a computer to execute the procedures and the methods of the friction identification unit 1, the model torque calculation unit 2, the motor torque detection unit, and the abnormality determination unit 4. Note that the memory may be a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disc, a mini disc, or a digital versatile disc (DVD), for example.

Advantageous effects produced by the abnormality diagnosis apparatus according to each embodiment described above will be explained below. The abnormality diagnosis apparatus according to the embodiments can calculate model torque resulting from compensation for the influence of friction that varies due to conditions such as temperature even in a normal state, such that the abnormality diagnosis apparatus extract with high accuracy a vibration component superimposed on motor torque as the rigidity of the power transmission mechanism 7 is lowered. As a result, the abnormality diagnosis apparatus can early diagnose whether the power transmission mechanism 7 is abnormal. To diagnose whether the power transmission mechanism 7 used in a machine that repeats the same operations is abnormal, also, the abnormality diagnosis apparatus according to the embodiments calculates motor torque resulting from correction corresponding to a change in friction on motor torque during the normal operation. As a result, the abnormality diagnosis apparatus can early diagnose whether the power transmission mechanism 7 is abnormal, without providing detailed models of the machine.

The abnormality diagnosis apparatus according to each embodiment uses the high-pass filter to thereby extract, in a more enhanced manner, a vibration component superimposed on motor torque as the rigidity of the power transmission mechanism 7 is lowered. As a result, the abnormality diagnosis apparatus can early diagnose whether the power transmission mechanism 7 is abnormal. For the abnormality diagnosis apparatus according to each embodiment, also, the time-differential of the estimated step disturbance in the observer extracts, in a more enhanced manner, a vibration component superimposed on motor torque as the rigidity of the power transmission mechanism 7 is lowered, as in the output of the high-pass filter. As a result, the abnormality diagnosis apparatus can early diagnose whether the power transmission mechanism 7 is abnormal.

The configurations presented in the respective embodiments above are examples of the present invention, and can be combined with other known technologies or can be partly omitted or modified without departing from the scope of the present invention.

REFERENCE SIGNS LIST 1 friction identification unit; 2, 19 model torque calculation unit; 3, 18 differential processing unit; 4 abnormality determination unit; 5 individual-shaft control system; 6 motor; 7 power transmission mechanism; 8 load unit; 9 control system simulation unit; motion equation calculation unit; 11 feedforward control unit; 12 feedback control unit; 13 axis simplified model; 14 rigid body model; 15 joint elasticity consideration model; 16 proportional control unit; 17 proportional integral unit; 20 two-inertia system observer; 21 initial data recording unit; 22 model torque correction unit; 25 individual-shaft controller; 27 control target machine; 28 target machine controller; 29 command generation unit; 31 external PC; 32 memory in controller; 33 storage unit in PC; 34 program generation unit; 35 threshold changing unit; 100, 100a hardware; 102 processing circuit; 103 processor; 104 memory.

The invention claimed is:
1. An abnormality diagnosis apparatus for a power transmission mechanism comprising:
   circuitry operative as the following:
   a friction identifier to calculate a friction parameter that is a parameter used for calculation of frictional force of the power transmission mechanism connected to a motor;
   a model torque calculator to calculate model torque by using a set value calculated in advance and the friction parameter, the model torque being an estimated value of torque of the motor; and
   an abnormality determiner to diagnose whether the power transmission mechanism is abnormal, on a basis of a result of comparison between the model torque and motor torque of the motor detected by a motor torque detector, and output an alarm responsive to a diagnosis of the power transmission mechanism being abnormal,
   wherein the friction parameter is based on an estimated friction including moving direction friction torque and/or speed friction torque of the motor.
2. The abnormality diagnosis apparatus according to claim 1, wherein
   the model torque calculator calculates the estimated value of the torque of the motor by using a position command given to the motor and a dynamic-characteristic model indicating dynamic characteristic of machinery including the power transmission mechanism, and
   the dynamic-characteristic model includes the estimated friction with the friction parameter updated in accordance with update instruction information output by the friction identifier.
3. The abnormality diagnosis apparatus according to claim 1, wherein the friction identifier calculates the friction parameter by performing an identification process by using the estimated friction that includes moving direction friction torque and speed friction torque of the motor.
4. The abnormality diagnosis apparatus according to claim 1, wherein the friction identifier calculates the friction parameter by performing an identification process by using the estimated friction including friction correction torque, the moving direction friction torque, and the speed friction torque, the friction correction torque being obtained by correcting uncorrected components of the moving direction friction torque and the speed friction torque.

5. The abnormality diagnosis apparatus according to claim 1, further comprising:
an initial data storage to store the motor torque detected by the motor torque detector during normal operation and a result of identification performed by the friction identifier during normal operation, wherein
the model torque calculator calculates the estimated value of the torque based on an output from the friction identifier, the motor torque stored in the initial data storage, and a result of the identification.

6. The abnormality diagnosis apparatus according to claim 1, further comprising:
a two-inertia system observer to correct motor torque input in advance by using the friction parameter, wherein each shaft of the motor is in a two-inertia system including the motor, a spring, and a load, wherein state variables include a step disturbance added as an estimated step disturbance, and wherein
based on time-differential of the estimated step disturbance output from the two-inertia system observer, the abnormality determining diagnoses whether the power transmission mechanism is abnormal.

7. The abnormality diagnosis apparatus according to claim 1, wherein
the abnormality determiner includes a high-pass filter to allow passage of signal components having frequencies higher than a preset frequency among a result of comparison between the model torque and the motor torque detected by the motor torque detector, and
based on the signal components passing through the high-pass filter, the abnormality determiner diagnoses whether the power transmission mechanism is abnormal.

8. The abnormality diagnosis apparatus according to claim 1, wherein
the abnormality determiner includes a bandpass filter to allow passage of signal components having a preset frequency among a result of comparison between the torque model and the motor torque detected by the motor torque detector, and
based on the signal components passing through the bandpass filter, the abnormality determiner diagnoses whether the power transmission mechanism is abnormal.

9. The abnormality diagnosis apparatus according to claim 1, wherein
the abnormality determiner includes a frequency analyzer to perform frequency analysis, and
based on transition of peak frequency obtained by the frequency analyzer, the abnormality determiner diagnoses whether the power transmission mechanism is abnormal.

10. The abnormality diagnosis apparatus according to claim 1, wherein
the abnormality determiner includes a non-dimensional symptom parameter calculator to calculate a non-dimensional symptom parameter, and
based on a result of comparison between the non-dimensional symptom parameter and a predetermined threshold, the abnormality determiner diagnosis whether the power transmission mechanism is abnormal.

11. The abnormality diagnosis apparatus according to claim 1, comprising:
a threshold changer to change a threshold for determining abnormality in the abnormality determiner, wherein the threshold to be output by the threshold changer is determined based on a command generated by a command generator.

12. The abnormality diagnosis apparatus according to claim 1, comprising:
a threshold changer to change a threshold for determining abnormality in the abnormality determiner, wherein the threshold is specified by a program generated by a program generator.

13. The abnormality diagnosis apparatus according to claim 1, wherein
the abnormality determiner includes a differential processor to calculate time-differential of a result of comparison between the model torque and the motor torque detected by the motor torque detector, and
the abnormality determiner diagnoses whether the power transmission mechanism is abnormal, based on an output of the differential processor.

14. An abnormality diagnosis method comprising:
calculating, using circuitry, a friction parameter that is a parameter used for calculation of frictional force of a power transmission mechanism connected to a motor,
calculating, using the circuitry, model torque by using a set value calculated in advance and the friction parameter, the model torque being an estimated value of torque of the motor;
detecting motor torque of the motor; and
diagnosing, using the circuitry, whether the power transmission mechanism is abnormal, on a basis of a result of comparison between the model torque and the motor torque; and
outputting, using the circuitry, an alarm responsive to said diagnosing resulting in a diagnosis that the power transmission mechanism is abnormal,
wherein the friction parameter is based on an estimated friction including moving direction friction torque and/or speed friction torque of the motor.

15. The abnormality diagnosis method according to claim 14, wherein the friction parameter is calculated by performing an identification process by using the estimated friction that includes friction correction torque, the moving direction friction torque, and the speed friction torque, the friction correction torque being obtained by correcting uncorrected components of the moving direction friction torque and the speed friction torque.

16. The abnormality diagnosis method according to claim 14, wherein each shaft of the motor is in a two-inertia system including the motor, a spring, and a load, state variables include a step disturbance added as an estimated step disturbance, motor torque input in advance is corrected by using the friction parameter, and, whether the power transmission mechanism is abnormal is diagnosed based on time-differential of the estimated step disturbance.

17. The abnormality diagnosis method according to claim 14, wherein the estimated value of the torque is calculated based on a result of identification of the friction parameter, the motor torque detected during normal operation which is recorded in an initial data recorder, and a result of identification of the friction parameter during normal operation which is recorded in the initial data recorder.

18. The abnormality diagnosis method according to claim 14, wherein a high-pass filter allows passage of signal components having frequencies higher than a preset frequency among a result of comparison between the model torque and the detected motor torque, and whether the power transmission mechanism is abnormal is diagnosed based on the signal components passing through the high-pass filter.

19. The abnormality diagnosis method according to claim 14, wherein a bandpass filter allows passage of signal components having a preset frequency among a result of comparison between the model torque and the detected motor torque, and whether the power transmission mechanism is abnormal is diagnosed based on the signal components passing through the bandpass filter.

20. The abnormality diagnosis method according to claim 14, wherein whether the power transmission mechanism is abnormal diagnosed based on time-differential of a result of comparison between the model torque and the detected motor torque.

* * * * *